United States Patent
Mitsumoto

(10) Patent No.: US 9,621,746 B2
(45) Date of Patent: Apr. 11, 2017

(54) INFORMATION PROCESSING APPARATUS, INFORMATION MANAGEMENT APPARATUS, CONTROL METHODS THEREOF, AND NON-TRANSITORY COMPUTER-READABLE STORAGE MEDIUM

(71) Applicant: CANON KABUSHIKI KAISHA, Tokyo (JP)

(72) Inventor: Shinichi Mitsumoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/556,689

(22) Filed: Dec. 1, 2014

(65) Prior Publication Data

US 2015/0181053 A1    Jun. 25, 2015

(30) Foreign Application Priority Data

Dec. 25, 2013  (JP) ................. 2013-268086

(51) Int. Cl.
*H04N 5/225*  (2006.01)
*H04N 5/232*  (2006.01)
*H04N 1/00*   (2006.01)
*H04N 1/21*   (2006.01)
*H04N 1/32*   (2006.01)

(52) U.S. Cl.
CPC ..... *H04N 1/00244* (2013.01); *H04N 1/00925* (2013.01); *H04N 1/00933* (2013.01); *H04N 1/2187* (2013.01); *H04N 1/2191* (2013.01); *H04N 1/32117* (2013.01); *H04N 2201/0084* (2013.01); *H04N 2201/3246* (2013.01); *H04N 2201/3276* (2013.01)

(58) Field of Classification Search
CPC ............... H04N 5/232; H04N 5/23203; H04N 2201/3276; H04N 2201/3246; H04N 2201/0084
See application file for complete search history.

(56) References Cited

U.S. PATENT DOCUMENTS 7,796,776 B2    9/2010  Inatomi et al. ............... 380/100
8,339,465 B2 *  12/2012 Hara ...................... H04N 5/232
                                          348/207.1
8,451,801 B2    5/2013  Isozu et al. .................. 370/332
(Continued)

FOREIGN PATENT DOCUMENTS

JP    2003-110790      4/2003
JP    2008-245234 A   10/2008
(Continued)

*Primary Examiner* — Lin Ye
*Assistant Examiner* — John H Morehead, III
(74) *Attorney, Agent, or Firm* — Fitzpatrick, Cella, Harper & Scinto

(57) ABSTRACT

An information processing apparatus generates data by a data generation operation by a user, transmits the data to an information management apparatus, and set a prescribed time capable of a disclosure cancel operation by the user upon generating the data. The information processing apparatus, when the prescribed time has elapsed without the cancel operation by the user, transmits, to the information management apparatus, a notification which allows disclosure of the data to another information processing apparatus.

20 Claims, 27 Drawing Sheets

(56) References Cited

U.S. PATENT DOCUMENTS

| | | | | |
|---|---|---|---|---|
| 2006/0170959 | A1* | 8/2006 | Mizoguchi | G08B 13/196 358/1.15 |
| 2006/0174203 | A1* | 8/2006 | Jung | G06F 17/3028 715/751 |
| 2007/0103553 | A1* | 5/2007 | Hara | H04N 5/232 348/207.1 |
| 2008/0122943 | A1* | 5/2008 | Itoh | G06K 9/00228 348/222.1 |
| 2012/0268611 | A1* | 10/2012 | Kimijima | H04N 1/00137 348/207.1 |
| 2013/0094829 | A1* | 4/2013 | Yang | G11B 27/34 386/230 |
| 2014/0368679 | A1* | 12/2014 | Fujinawa | H04N 1/00127 348/211.2 |
| 2015/0038076 | A1* | 2/2015 | Naruse | H04W 4/008 455/41.1 |

FOREIGN PATENT DOCUMENTS

| | | |
|---|---|---|
| JP | 2012-227814 A | 11/2012 |
| WO | WO 2005/094064 A1 | 10/2005 |

* cited by examiner

| GROUP ID | APPARATUS ID | STATE |
|---|---|---|
| g001 | d001, d004, d007 | END |
| g002 | d002, d003, d005, d006, d008, d009 | END |
| ... | ... | ... |
| g010 | d001, d003, d007, d009 | OPEN |

| IMAGE ID | APPARATUS ID | GROUP ID | FILE NAME | SHARING/NON-SHARING |
|---|---|---|---|---|
| img0001 | d001 | g001 | file://g001/d001/IMG_246.jpg | DISCLOSED |
| img0002 | d007 | g001 | file://g001/d007/IMG_123.jpg | NON-DISCLOSED |
| img0003 | d004 | g001 | file://g001/d004/IMG_469.jpg | DISCLOSED |
| ... | ... | ... | ... | ... |
| img0300 | d007 | g010 | file://g010/d007/IMG_346.jpg | DISCLOSED |

F I G. 16A
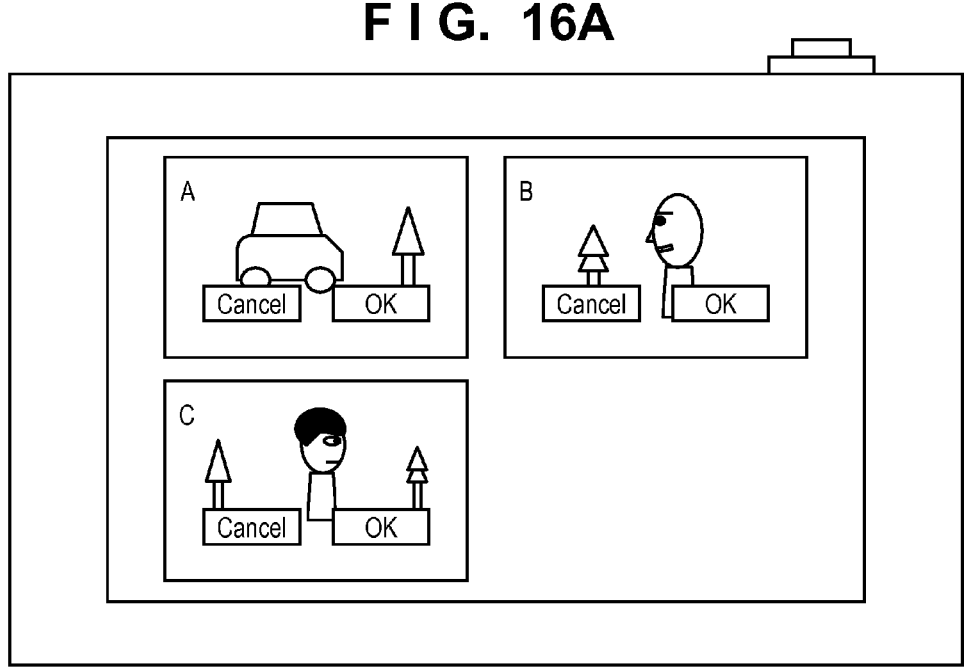
F I G. 16B
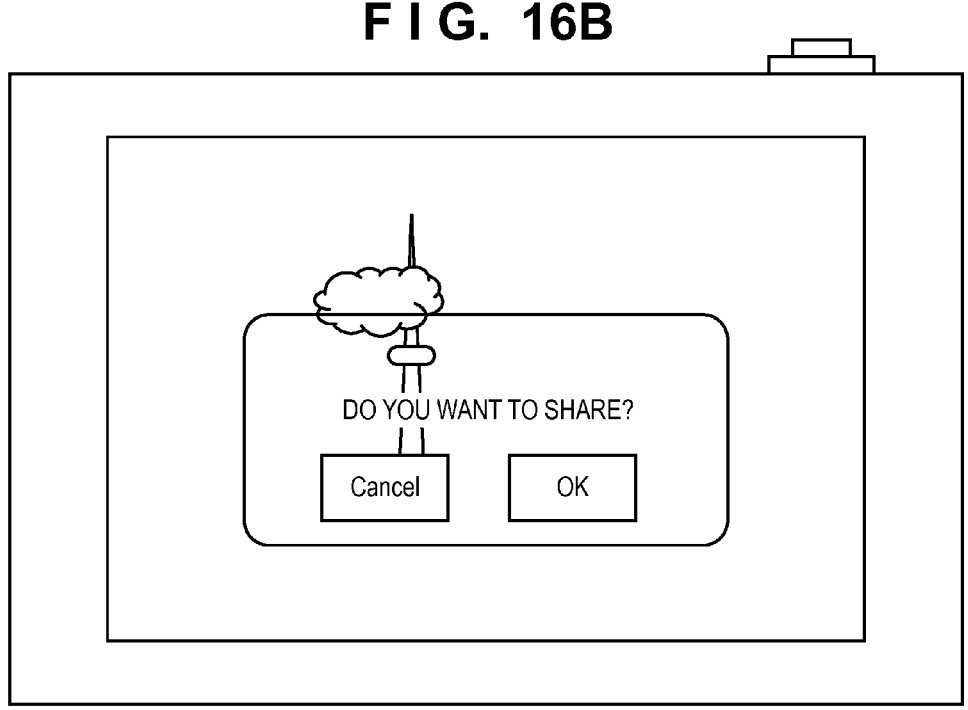

F I G. 20
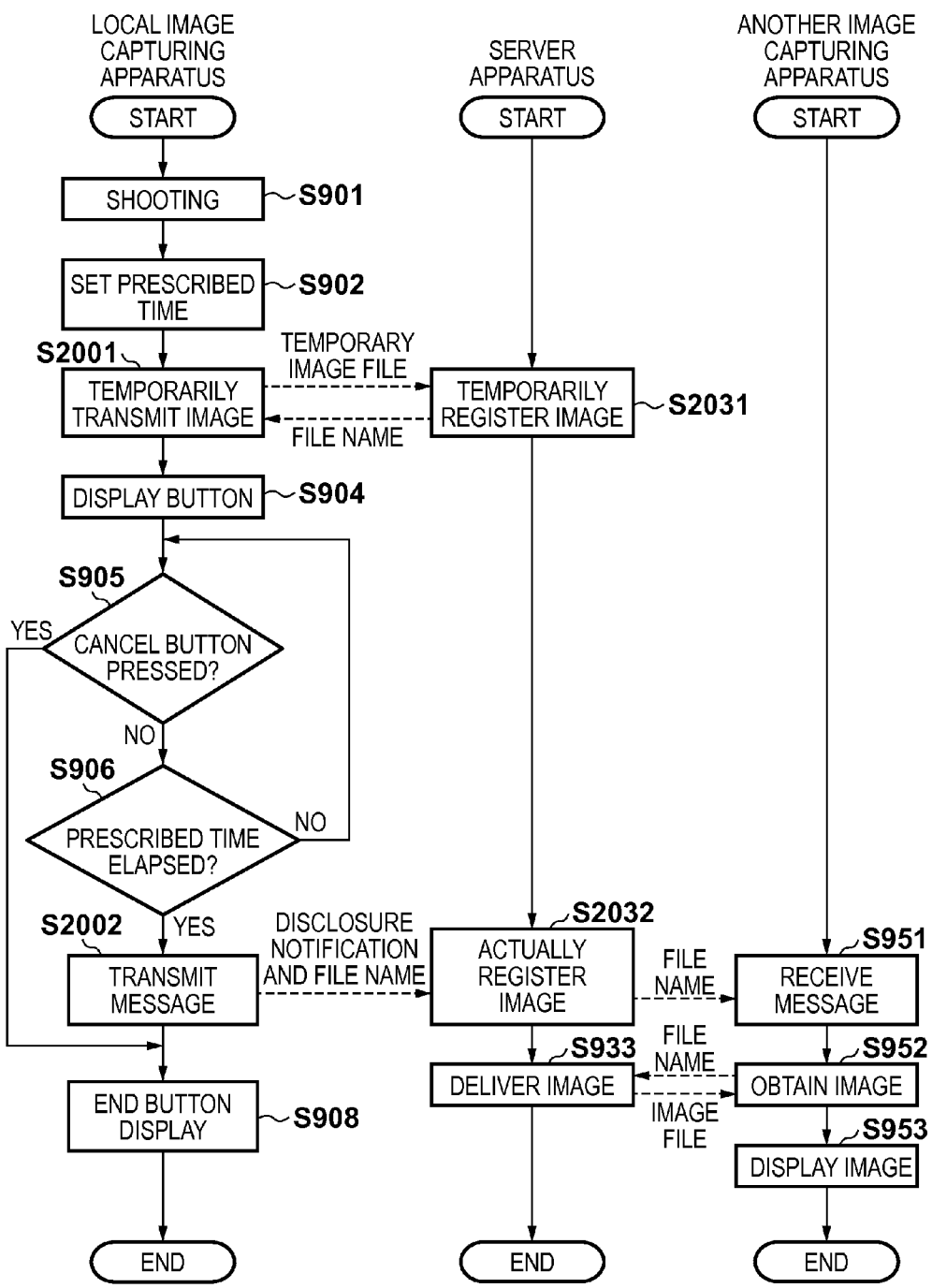

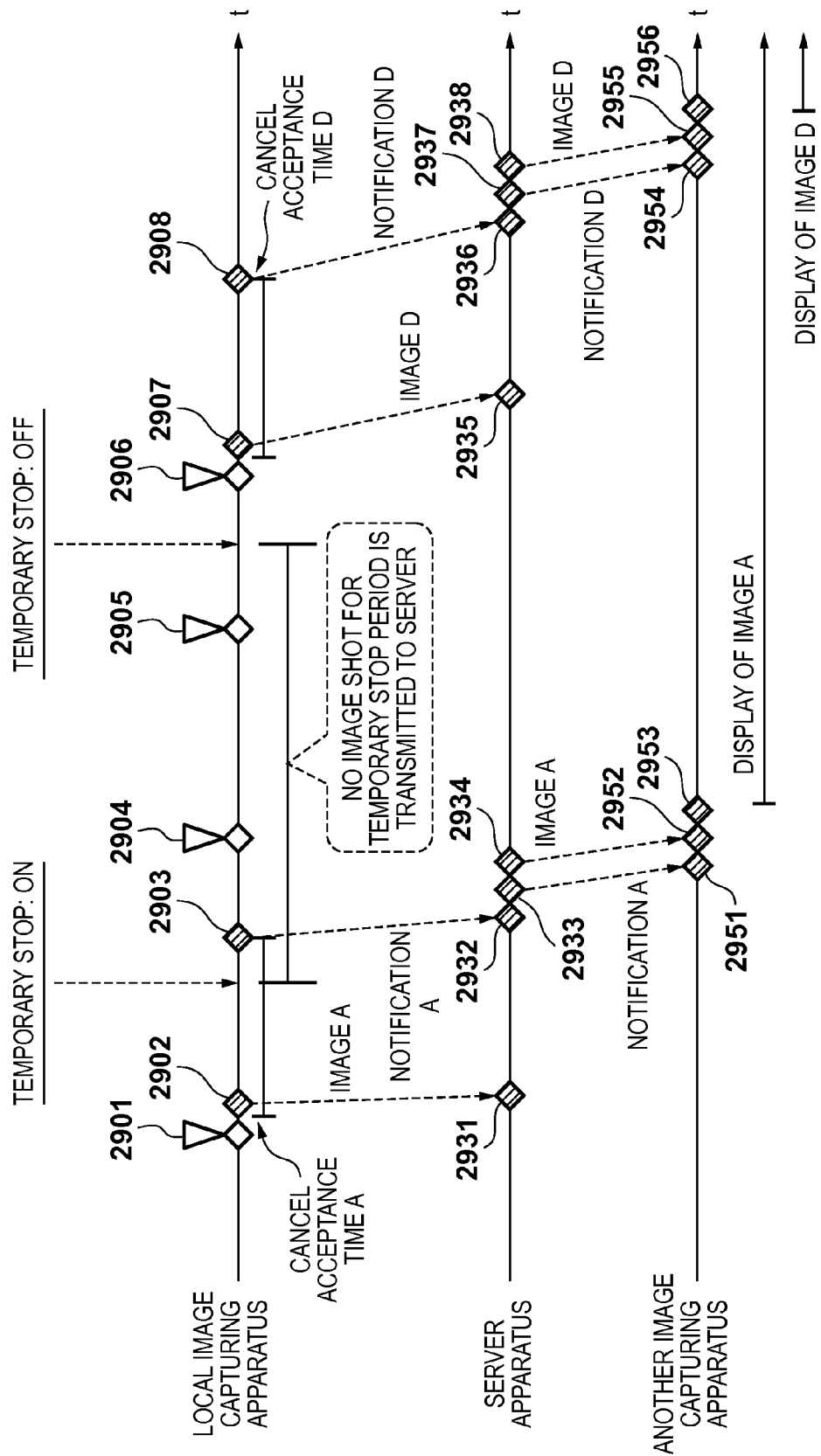

INFORMATION PROCESSING APPARATUS, INFORMATION MANAGEMENT APPARATUS, CONTROL METHODS THEREOF, AND NON-TRANSITORY COMPUTER-READABLE STORAGE MEDIUM

BACKGROUND OF THE INVENTION

Field of the Invention

The present invention relates to an information processing apparatus, information management apparatus, control methods thereof, and non-transitory computer-readable storage medium which control disclosure and non-disclosure of data in a group when the data is shared by a plurality of users belonging to the group.

Description of the Related Art

In recent years, smartphones and digital cameras with network connection functions are very popular. On-line storages as the services for storing data in server machines on networks are also very popular (e.g., URL: http://www.dropbox.com/ non-patent literature 1). By combining a device with a network connection function and an on-line storage service, a user can share an image shot by himself with another user by automatic upload of the image although the user himself does not upload the image to the server. Japanese Patent Laid-Open No. 2012-227814 discloses a method of allowing a plurality of users to immediately view images shot by them. Japanese Patent Laid-Open No. 2003-110790 discloses a method of confirming whether to disclose a shot image every time.

As in Japanese Patent Laid-Open No. 2012-227814, when the image shot by the user is immediately disclosed to another user, even if the user shoots a failed picture or an object that the user does not want another user to see, the picture that the user does not want to share is immediately disclosed to another user. As in Japanese Patent Laid-Open No. 2003-110790, when confirmation is required to determine whether the shot image is to be shared with another user every time, the user's operation is cumbersome because the user must select disclosure or non-disclosure every time. In addition, since the image is uploaded to the server after the selection result of the user, the start of sharing the shot image with another user is delayed.

SUMMARY OF THE INVENTION

The present invention has been made to solve the conventional problems described above and provides an apparatus and method for preventing the user from unintended picture sharing without increasing cumbersome user operation.

According to one aspect of the present invention, there is provided an information processing apparatus comprising: a generation unit configured to generate data by a data generation operation by a user; a communication unit configured to transmit the data to an information management apparatus; and a setting unit configured to set a prescribed time capable of a disclosure cancel operation by the user upon generating the data, wherein when the prescribed time has elapsed without the cancel operation by the user, the communication unit transmits, to the information management apparatus, a notification which allows disclosure of the data to another information processing apparatus.

Further features of the present invention will become apparent from the following description of exemplary embodiments (with reference to the attached drawings).

BRIEF DESCRIPTION OF THE DRAWINGS

FIG. 6 is a management table of group information according to some embodiments;

FIG. 7 is a management table of image information according to some embodiments;

FIGS. 16A and 16B are views showing an UI (User Interface) for selecting disclosure when continuous shooting is performed according to the fourth embodiment;

FIG. 20 is an operation flowchart of a system according to the fifth embodiment;

FIG. 29 is a view showing data exchange of the system according to the ninth embodiment.

DESCRIPTION OF THE EMBODIMENTS

Some embodiments of the present invention will be described in detail with reference to the accompanying drawings. Note that the arrangements of the following embodiments are merely examples, and the present invention is not limited to these arrangements.

<First Embodiment>

Figure 1:
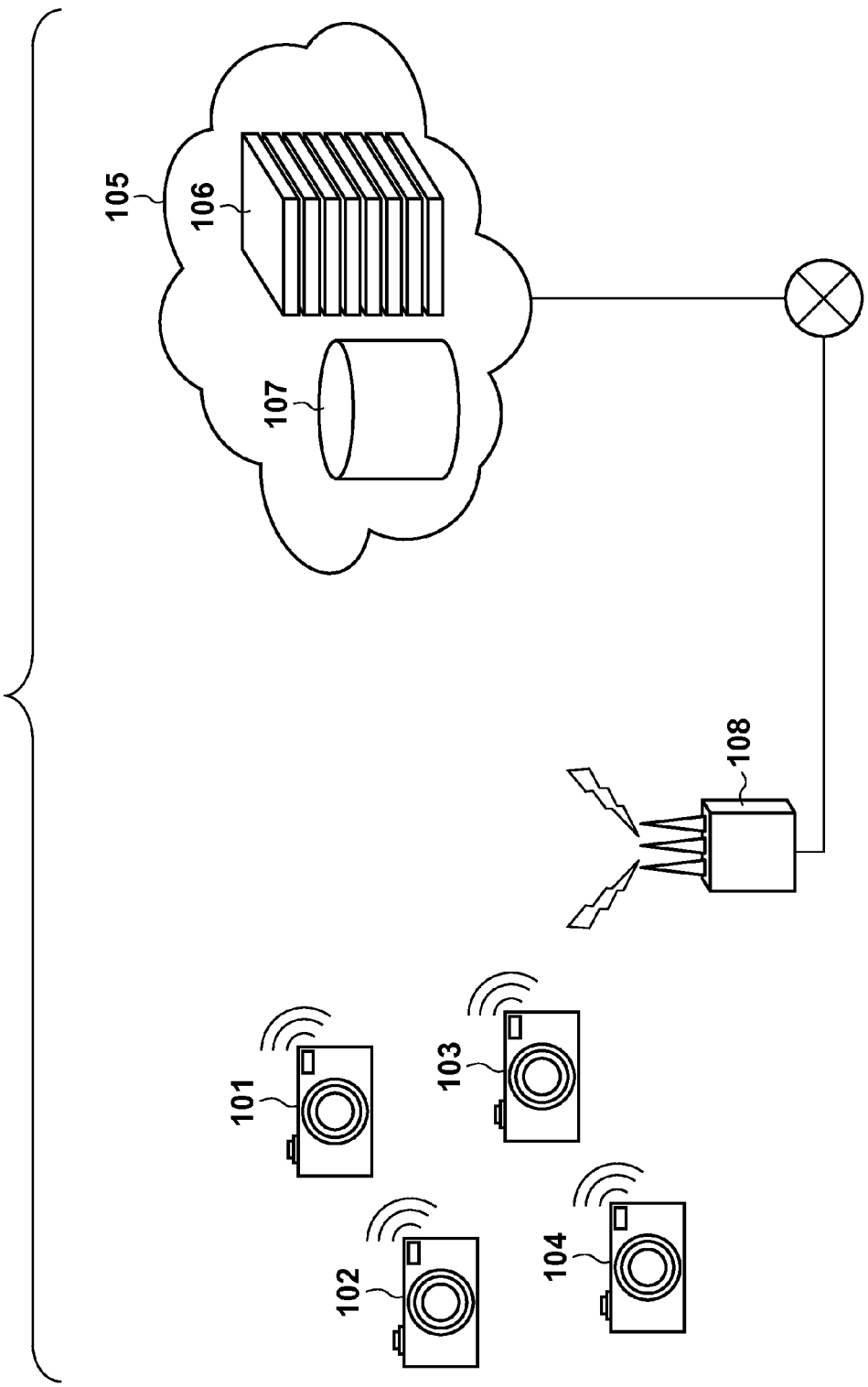
FIG. 1 is a view showing the arrangement of the overall system according to some embodiments.

FIG. 1 is a view showing the arrangement of an overall system for implementing this embodiment. Image capturing apparatuses (information processing apparatuses) 101 to 104 have a communication function with a network which cooperatively performs group shooting in the image capturing system of this embodiment. A server apparatus (information management apparatus) 105 present in a cloud has the server function of the image capturing system according to this embodiment. The server apparatus 105 includes a virtual machine service 106 which executes various kinds of arithmetic processing and a storage service 107 in which images shot by the image capturing apparatus are stored. A connection apparatus 108 has a function of connecting the image capturing apparatuses 101 to 104 to the network. The connection apparatus 108 may be the access point of a wireless LAN or the base station of a wireless public network. Note that in this embodiment, although the server apparatus comprises the virtual machine present in the cloud, but may comprise a normal server apparatus without any problem. The server apparatus may comprise an image capturing apparatus incorporating a server apparatus function and having both the image capturing apparatus function and the server apparatus function.

Figure 2:
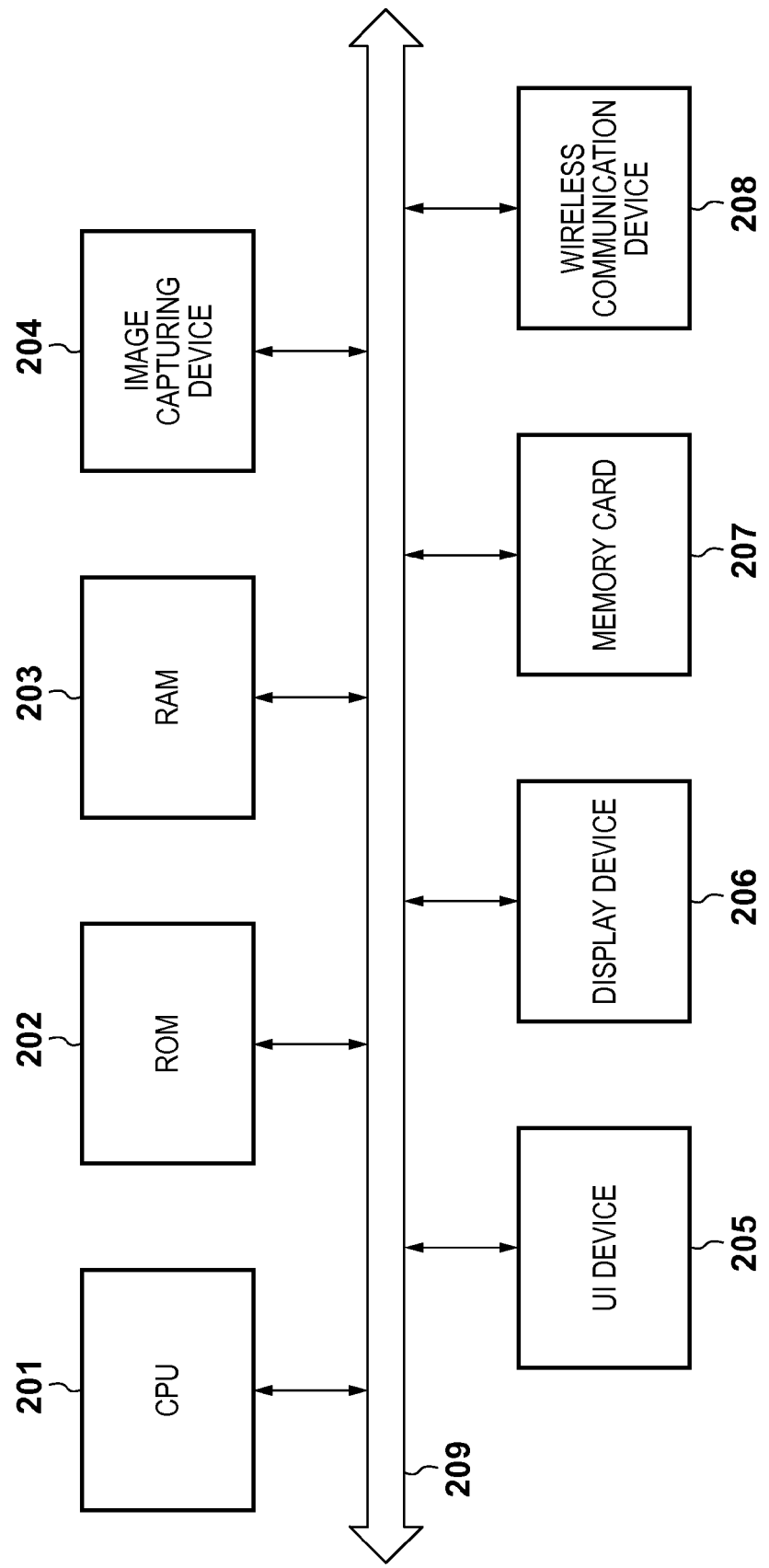
FIG. 2 is a block diagram showing the internal arrangement of an image capturing apparatus according to some embodiments.

FIG. 2 is a block diagram showing the internal arrangement of the image capturing apparatus for implementing this embodiment. A CPU 201 executes various kinds of arithmetic processing and logic judgment and controls various constituent elements connected to a bus 209. This apparatus includes memories including a program memory and a data memory. The program memory stores programs including processing sequences to be described later and controlled by the CPU. The memory may be a ROM 202 or a RAM 203 to which programs are loaded from an external memory. An image capturing device 204 includes an image sensor for receiving light from an object, received through an image capturing lens, converting the light into an image capturing signal, and outputting it, and an A/D converter for converting the image capturing signal from the image sensor into image data and outputting it. A UI (User Interface) device 205 includes, for example, various buttons, a mouse, a keyboard, or a touch panel device mounted on the image capturing apparatus. A display device 206 comprises a display panel mounted on the image capturing apparatus and can display a shot image and various kinds of information presented to the user under the control of the CPU 201. A memory card 207 is a detachable storage device which stores image data obtained by the image capturing apparatus and various kinds of supplementary information. A wireless communication device 208 can transmit or receive data of the image capturing apparatus or calculated data to or from another device.

Figure 3:
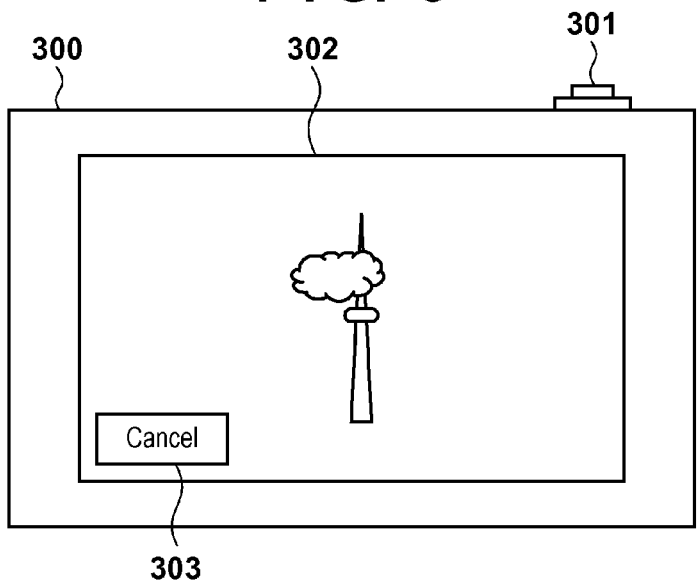
FIG. 3 is a view showing a display example on the back surface of the image capturing apparatus according to some embodiments.

FIG. 3 is a view showing the back surface of the image capturing apparatus which implements this embodiment. An image capturing apparatus 300 includes a shutter 301 which triggers shooting and a display screen 302 for displaying an image shooting screen. In this embodiment, a display screen 302 includes a touch panel display. A button 303 for detecting pressing on the screen is formed in the display screen 302. Note that the button 303 may be a mechanical button in place of the touch panel.

Figure 4:
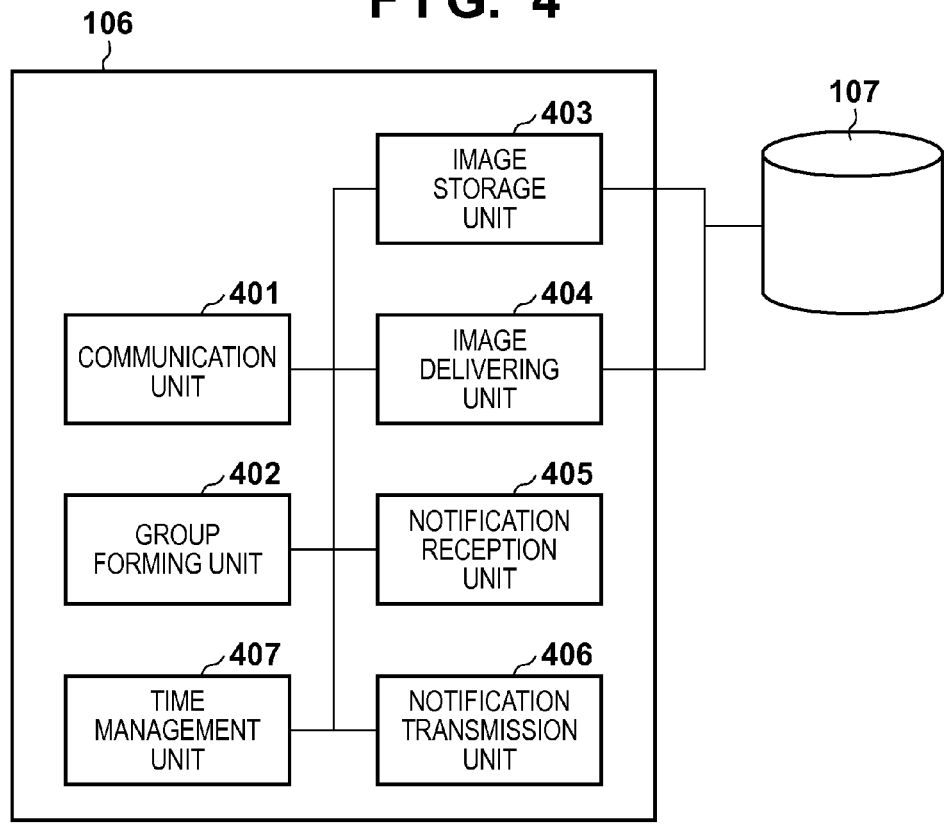
FIG. 4 is a block diagram showing the internal arrangement of a server apparatus according to some embodiments.

FIG. 4 is a block diagram showing the internal arrangement of the server apparatus which implements this embodiment. Referring to FIG. 4, the virtual machine service 106 includes a communication unit 401, a group forming unit 402, an image storage unit 403, an image delivering unit 404, a notification reception unit 405, a notification transmission unit 406, and a time management unit 407. The communication unit 401 communicates with the image capturing apparatus of this embodiment via the network. The group forming unit 402 forms a group in a system in which shot images are shared. More specifically, the group forming unit 402 performs formation, participation, and resignation with respect to a group and manages the image capturing apparatus. The image storage unit 403 accumulates images shot by the image capturing apparatus. The image delivering unit 404 delivers an image file to each image capturing apparatus. The image storage unit 403 and the image delivering unit 404 are connected to the storage service 107. The notification reception unit 405 and the notification transmission unit 406 exchange messages with the image capturing apparatus. The time management unit 407 manages a time about predetermined processing.

Figure 5:
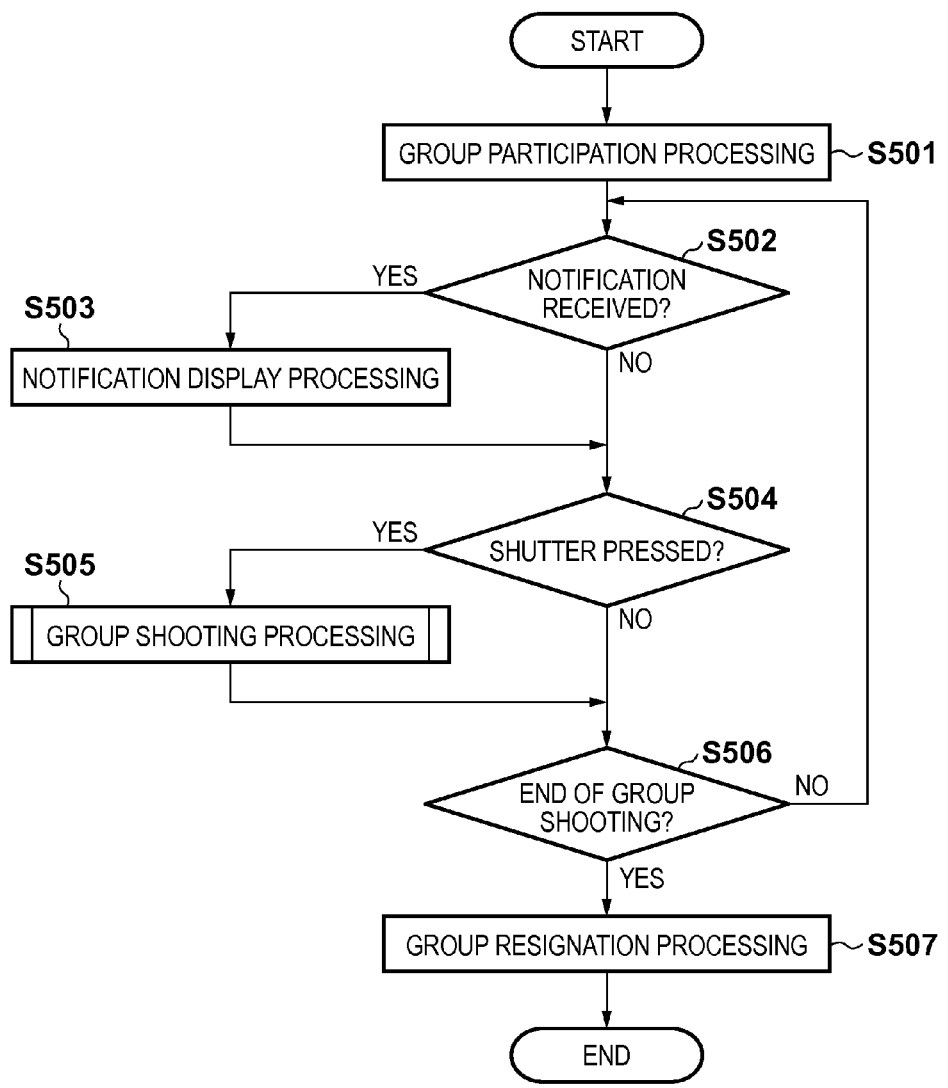
FIG. 5 is a flowchart showing the operation of the image capturing apparatus according to some embodiments.

FIG. 5 is a flowchart for explaining the operation about group shooting in the image capturing apparatus of this embodiment. The processing according to the flowchart shown in FIG. 5 is executed when the image capturing apparatus of this embodiment performs shooting.

Referring to FIG. 5, S501 is a step in which after activation of the image capturing apparatus, the user operates to participate in group shooting when the CPU 201 connects to the image capturing system of this embodiment using the wireless communication device 208. A means for participation into a group and a means for forming a group are not main subjects to the present invention, and any methods can be used. For example, the participation into the group and the formation of the group may be managed by a group table of the service apparatus. FIG. 6 shows an example of a group table 601 of the server apparatus. The group table 601 in FIG. 6 includes, as items, a "group ID" for identifying each group, "apparatus IDs" of the apparatuses belonging to each group, and a "state" representing the state of each group. When a user who wishes to participate in a group participates in an already existing group, the user operates the image capturing apparatus to send a corresponding group ID and a local apparatus ID to the server apparatus and requests the server apparatus to register the apparatus ID in the group table 601. If a user who wishes to participate in a group forms a new group, the user operates the image capturing apparatus to request the server apparatus to form this new group and receives the formed group ID from the server. Other users who wish to participate in groups can obtain group IDs by requesting the server apparatus to notify group IDs by emails or by shooting two-dimensional codes including the received group IDs.

S502 is a step in which the CPU 201 determines whether the wireless communication device 208 receives, from the server apparatus, a disclosure notification indicating that an image shot by another image capturing apparatus can be shared. If the disclosure notification is received, (YES in step S502), the process advances to step S503; otherwise (NO in step S502), the process advances to step S504.

Figure 8:
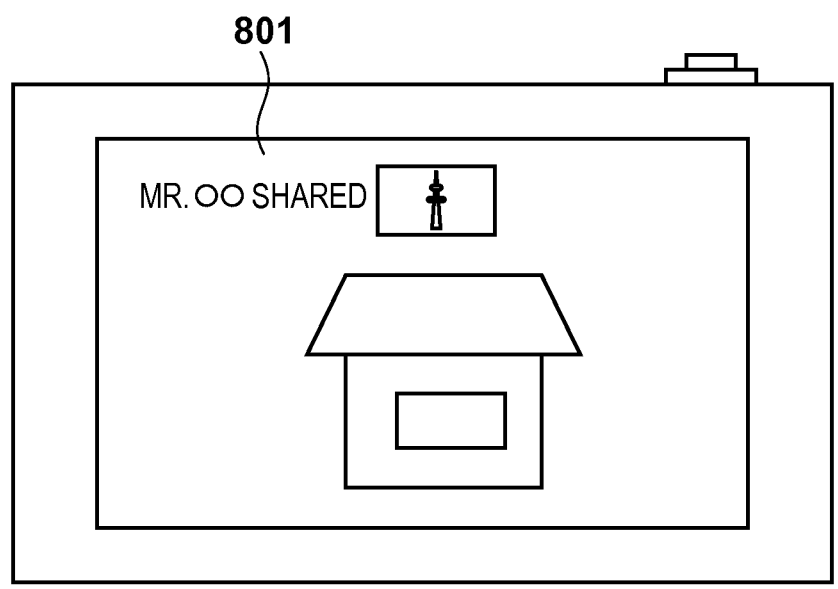
FIG. 8 is a view showing a notification display example on the back surface of the image capturing apparatus according to some embodiments.

S503 is a step in which information indicating that the image shot by another image capturing apparatus can be shared by the disclosure notification sent from the server apparatus and received in step S502 is displayed on the display device 206 by the CPU 201. The received disclosure notification contains information about an image ID. FIG. 7 shows an example of an image table managed by the server apparatus. The first line of an image table 701 in FIG. 7 indicates items, that is, an "image ID", an "apparatus ID", a "group ID", a "file name", and "shared/non-shared". The "image ID" indicates a unique ID of an image exchanged between the server apparatus and each image capturing apparatus. The "file name" indicates a file name in the server apparatus. The "shared/non-shared" indicates disclosure or non-disclosure to a third person other than the user himself. The data exchange between the server apparatus and each image capturing apparatus will be described in group shooting processing 5505 later. FIG. 8 shows an example of information displayed in the image capturing apparatus. Like notification display 801, specific images disclosed by specific users are displayed for a certain time on the display screen (the display device 206) on the back surface of the image capturing apparatus under the control of the CPU 201.

S504 is a step in which the CPU 201 judges whether the shutter 301 is pressed in the image capturing device 204. If the shutter is pressed (YES in step S504), the process advances to step S505; otherwise (NO in step S504), the process advances to step S506. The CPU 201 may make the judgment in step S504 by detecting a shooting trigger by a means other than the shutter 301.

S505 is a step in which the CPU 201 executes group shooting processing for disclosing, to a group, an image shot using the image capturing device 204. The details of the processing will be described later with reference to the flowchart. S506 is a step in which the CPU 201 judges the end of group shooting. If group shooting ends (YES in step S506), the process advances to step S507; otherwise (NO in step S506), the process advances to step S502.

S507 is a step in which the CPU 201 executes group shooting resignation processing. The group shooting resignation processing is not the main subject to the present invention, and any method can be used. For example, the user may operate the image capturing apparatus to send the group ID and apparatus ID to the server apparatus, and the server apparatus may exclude this apparatus ID from the corresponding group ID, thereby executing resignation processing.

Figure 9:
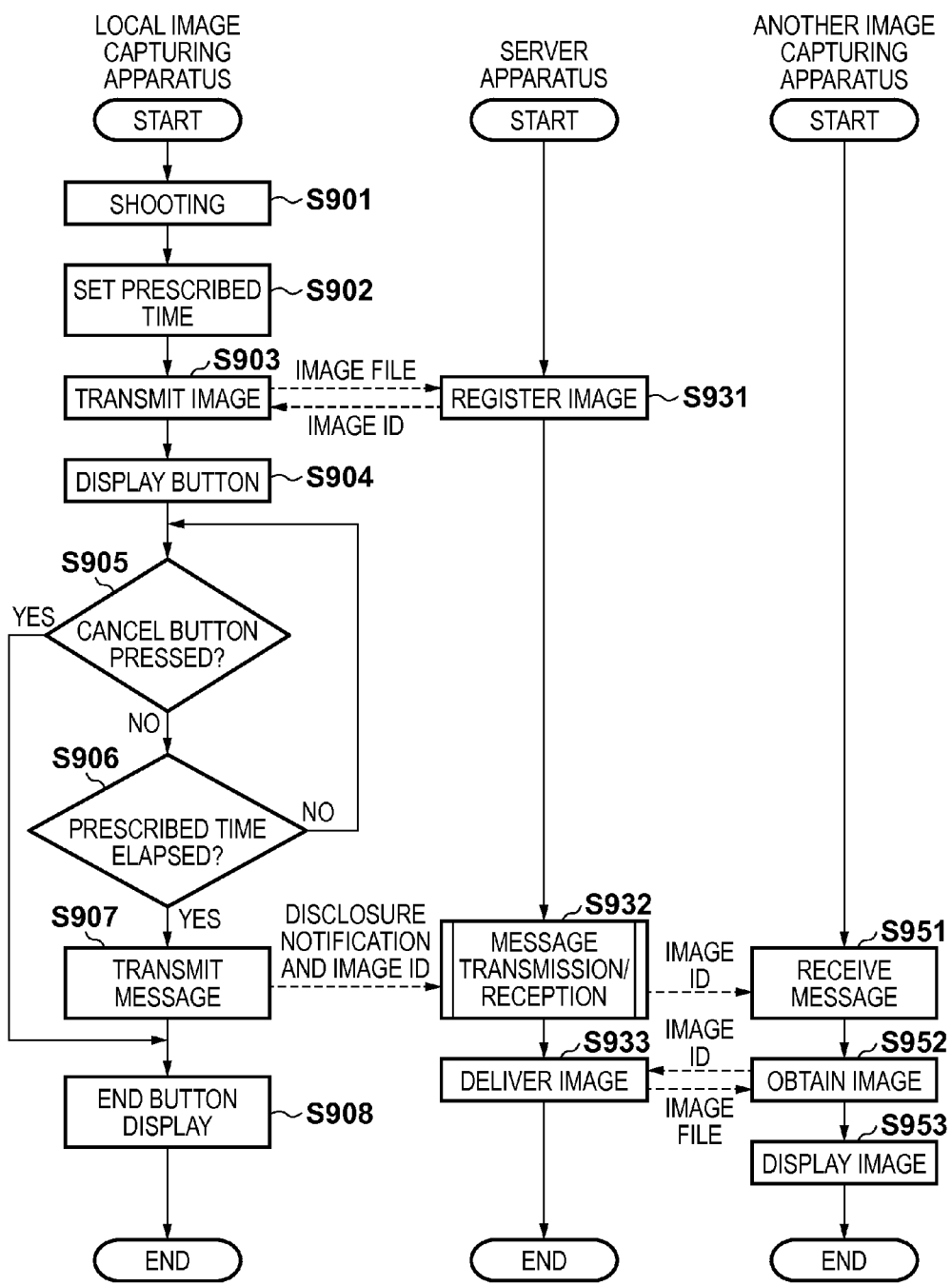
FIG. 9 is an operation flowchart of a system according to the first embodiment.

The group shooting processing 5505 will now be described with reference to the flowchart of FIG. 9. FIG. 9 is a flowchart showing the operations of the image capturing apparatus, the server apparatus, and another image capturing apparatus according to this embodiment. Referring to FIG. 9, the processing sequence of the server apparatus is represented by steps S901 to S908, the processing sequence of the server apparatus is represented by steps S931 to S933, and the processing sequence of the other image capturing apparatus is represented by steps S951 to S953. The processing sequences of the image capturing apparatus, the server apparatus, and the other image capturing apparatuses will be described below.

First of all, the processing sequence (steps S901 to S908) of the image capturing apparatus will be described below. S901 is a step in which the image capturing device 204 performs shooting as the data generation operation to generate a shot image and the CPU 201 stores the shot image in the memory card 207. S902 is a step in which the CPU 201 sets a time (prescribed time) for accepting a disclosure cancel operation against the disclosure to the other image capturing apparatus. This step may be performed as follows. That is, the user may set the time using a time setting unit (not shown), and the CPU 201 may manage the set time. S903 is a step in which the wireless communication device 208 starts transmission of the shot image file stored in the memory card 207 to the server apparatus. In this case, the server apparatus notifies the image ID of the image file transmitted to the server apparatus. The process may advance to the next step before the end of transmission. S904 is a step in which the CPU 201 displays the image transmitted to the server apparatus on the display device 206 and the cancel button by the prescribed time set in step S902. The cancel button is the button 303 displayed on the back surface of the image capturing apparatus in FIG. 3.

S905 is a step in which the CPU 201 judges whether the cancel button is pressed. If the cancel button is pressed (YES in step S905), the process advances to step S908; otherwise (NO in step S905), the process advances to step S906. S906 is a step in which the CPU 201 judges whether the prescribed time set in step S902 has elapsed. If the CPU 201 judges that the prescribed time has not elapsed (NO in step S906), the process advances to step S905; otherwise (YES in step S906), the process advances to step S907. S907 is a step in which the wireless communication device 208 transmits the disclosure notification to the server apparatus. S908 is a step in which the CPU 201 ends the display of the image displayed in step S904 and the display of the cancel button.

The processing sequence (steps S931 to S933) of the server apparatus will be described below. S931 is a step in which the communication unit 401 receives the image file from the image capturing apparatus which have performed shooting, the image storage unit 403 stores the image file in the storage service 107, and the notification transmission unit 406 transmits, to the image capturing apparatus, the message including the image ID of the stored image file. As shown in FIG. 7, the group forming unit 402 forms a new image ID in the image table 701 and registers the apparatus ID of the transmission source and the belonging group ID in the storage service 107. The group forming unit 402 sets the storage destination of the image file in the item of the "file name" and sets the item of "shared/non-shared" to the "non-disclosure".

S932 is a step in which the notification reception unit 405 receives the disclosure notification and at the same time the image ID from the image capturing apparatus and the notification transmission unit 406 transmits the received image ID to the other image capturing apparatus. After the notification reception unit 405 receives the disclosure notification, the group forming unit 402 changes the "shared/non-shared) information (the item of "shared/non-shared") in the target image ID in the image table 701 from the "non-disclosure" to the "disclosure". The details of the processing in step S932 will be described later using the flowchart in FIG. 10. S933 is a step in which the notification reception unit 405 receives the reception request containing the image ID from the other image capturing apparatus and the image delivering unit 404 delivers the image file corresponding to this image ID to the other image capturing apparatus. The processing sequence of the server apparatus 105 has been described above.

The processing sequence (steps S951 to S953) of the other image capturing apparatus will be described below. S951 is a step in which the wireless communication device 208 receives the image ID from the server apparatus. S952 is an image obtaining step in which the wireless communication device 208 inquires of the server apparatus the location (file name) of the file corresponding to the image ID received in step S951 and receive the image file. S953 is a step in which the CPU 201 displays the image file obtained in step S952 on the display screen of the image capturing apparatus. More specifically, the wireless communication device 208 receives the location of the file as a message from the server apparatus and downloads the image file in accordance with the location of the received file. The processing sequence of the other image capturing apparatus has been described above. Note that in this embodiment, the messages exchanged between the image capturing apparatus, the server apparatus, and the other image capturing apparatus may contain information other than that described above. For example, the message transmitted from the server apparatus in step S932 may contain the disclosure notification.

Figure 10:
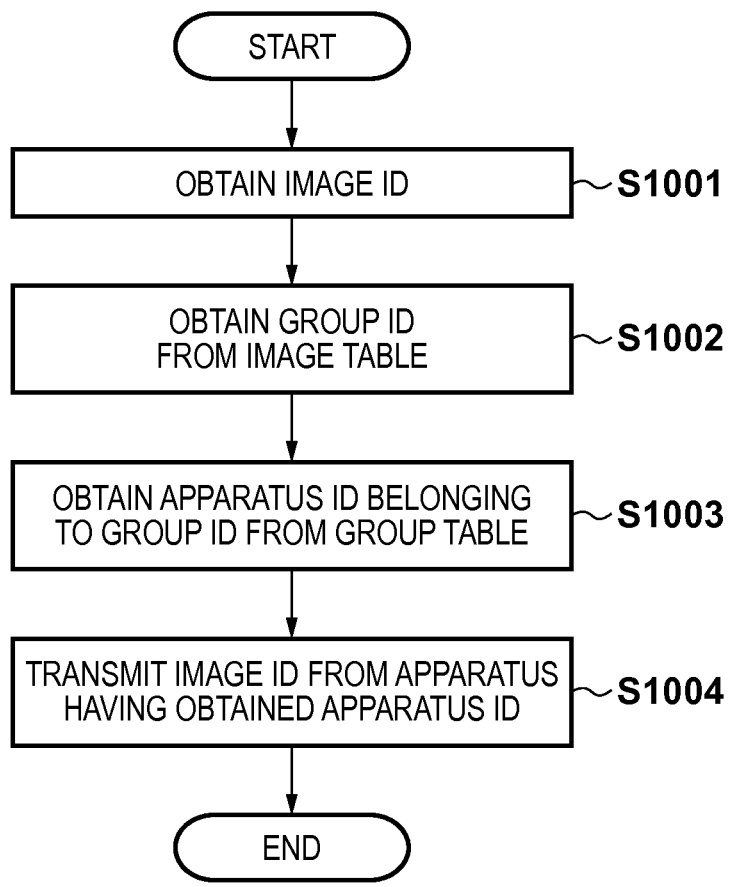
FIG. 10 is a flowchart for transmitting an image ID from a server apparatus to another image capturing apparatus according to the first embodiment.

Processing for allowing the server apparatus to transmit the image ID to the other image capturing apparatus belonging to the group, as the processing in step S932 will be described with reference to FIG. 10. FIG. 10 is a flowchart for transmitting the image ID from the server apparatus of this embodiment to the image capturing apparatus belonging to the group. S1001 is a step in which the notification reception unit 405 receives the image ID and the disclosure notification for disclosing the image from the image capturing apparatus to the other image capturing apparatus and the group forming unit 402 obtains the image ID. S1002 is a step in which the group forming unit 402 obtains the group ID of the image ID obtained in step S1001 from the image table 701 containing this image ID. S1003 is a step in which the group forming unit 402 obtains the group included in the group ID obtained in step S1002 from the group table 601 containing the group including this group ID and obtains the apparatus ID of the image capturing apparatus included in this group. S1004 is a step in which the notification transmission unit 406 transmits the image ID to the apparatus having the apparatus ID obtained in step S1003.

Figure 11:
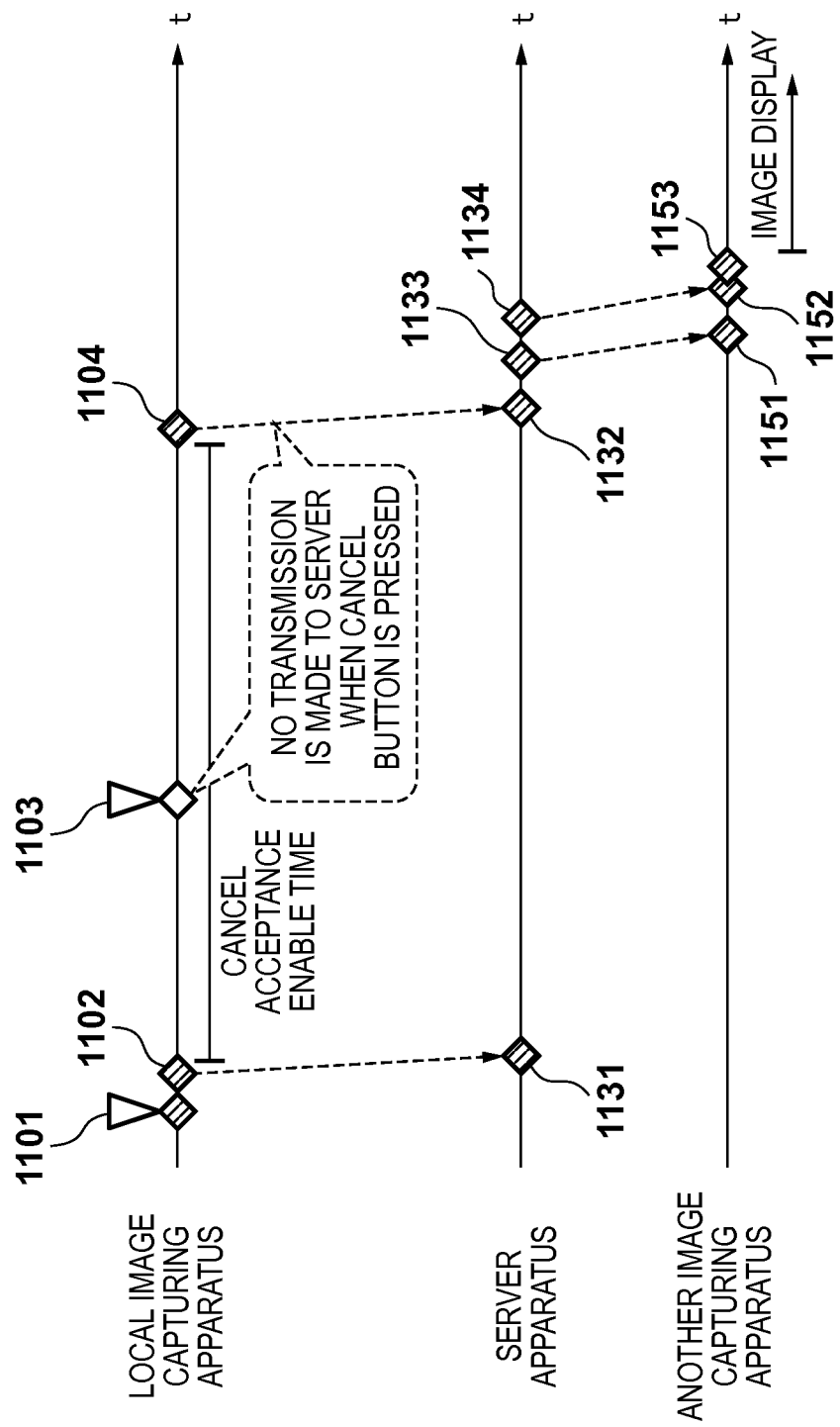
FIG. 11 is a view showing data exchange in a system according to the first embodiment.

As described above, according to this embodiment, group shooting in which a plurality of users participate allows processing for canceling sharing of shot images to a group. FIG. 11 shows the data exchange between the image capturing apparatus and the server apparatus according to this embodiment. A process 1101 corresponds to step S901 and represents that the image capturing apparatus performs shooting. A process 1102 corresponds to step S903 and represents that the image capturing apparatus transmits an image file to the server apparatus. A process 1103 corresponds to step S905 and represents that the image capturing apparatus detects pressing of the cancel button by the user. A process 1104 corresponds to step S907 and represents that the image capturing apparatus transmits a disclosure notification to the server apparatus upon the elapse of the prescribed time. A process 1131 corresponds to step S931 and represents that the server apparatus stores the image file. A process 1132 and a process 1133 correspond to step S932 and represent that the server apparatus receives the disclosure notification and the image ID from the image capturing apparatus and the server apparatus transmits the image ID to another image capturing apparatus. A process 1134 corresponds to step S933 and represents that the server apparatus delivers an image to the other image capturing apparatus. A process 1151 corresponds to step S951 and represents that the other image capturing apparatus receives the image ID from the server apparatus. A process 1152 corresponds to step S952 and represents that the other image capturing apparatus obtains the image file from the server apparatus. A process 1153 corresponds to step S953 and represents that the other image capturing apparatus displays the obtained image.

When the image capturing apparatus performs image shooting, it transmits, to the server apparatus, its image file whose setting is in the non-disclosure state. Within a certain time, the user of this image capturing apparatus can operate to cancel the disclosure. When the user of this image capturing apparatus does not select the cancel operation within the certain time and the prescribed time has elapsed, the disclosure notification is transmitted to the server apparatus, thereby disclosing the image to another image capturing apparatus. To the contrary, when the user of the image capturing apparatus operates to select cancel button, designation indicating that the image is not disclosed is made. No disclosure notification is transmitted to the server apparatus, and the image is not disclosed to the other image capturing apparatus. As compared with the method in which sharing availability is selected by the user every time, the image capturing apparatus with the cancel function automatically transmits the image to the server. The cumbersome operation of the user can be omitted. Since the image file is immediately transmitted to the server apparatus, the time required for sharing the image can be shortened as compared with the method in which the image is transmitted after the user selects sharing availability.

Figure 12:
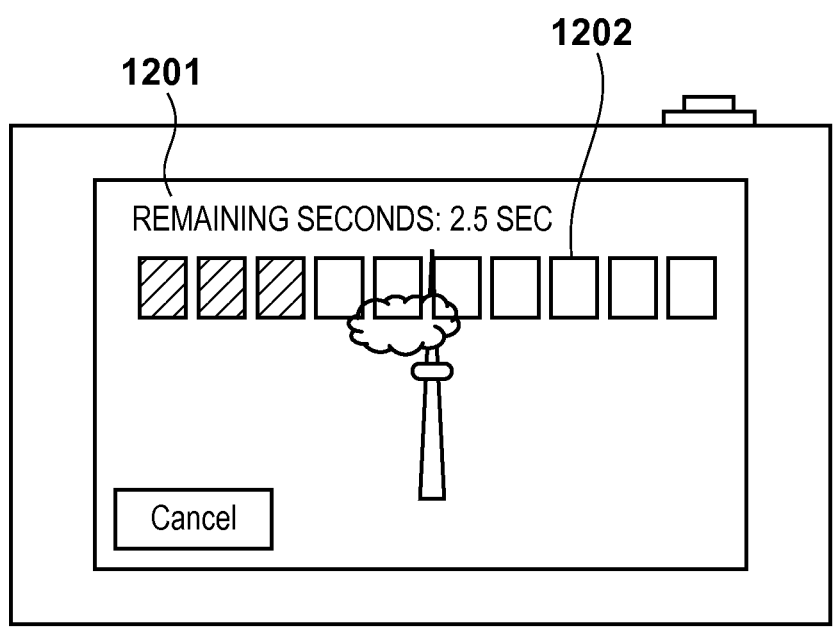
FIG. 12 is a view showing a display example of cancel enable time on the back surface of the image capturing apparatus according to the second embodiment.

Note that the image capturing apparatus may explicitly present the cancel enable time to the user. FIG. 12 shows an example of displaying the cancel enable time on the display screen on the back surface of the image capturing apparatus under the control of the CPU 201. As shown in FIG. 12, the remaining seconds of the cancel acceptance time or percentage of the total remaining time may be displayed in the form of an indicator. The input unit for image sharing cancellation is exemplified as the use of a button in this embodiment. The input unit may, however, be a trigger for canceling image sharing. In this case, x is input on the touch panel of the display screen, and this input may be used as a gesture command for recognizing image sharing cancellation. In addition, if a vibration detection device is provided in the UI device 205, the user may shake the image capturing apparatus to indicate image sharing cancellation. Alternatively, if the image capturing apparatus is provided with a voice input device or the CPU can execute voice recognition processing, the cancellation may be notified by voice. The information processing system of this embodiment exemplifies the data to be shared as a photograph as image data. However, the data to be shared may be an audio or a moving image.

<Second Embodiment>

Figure 13:
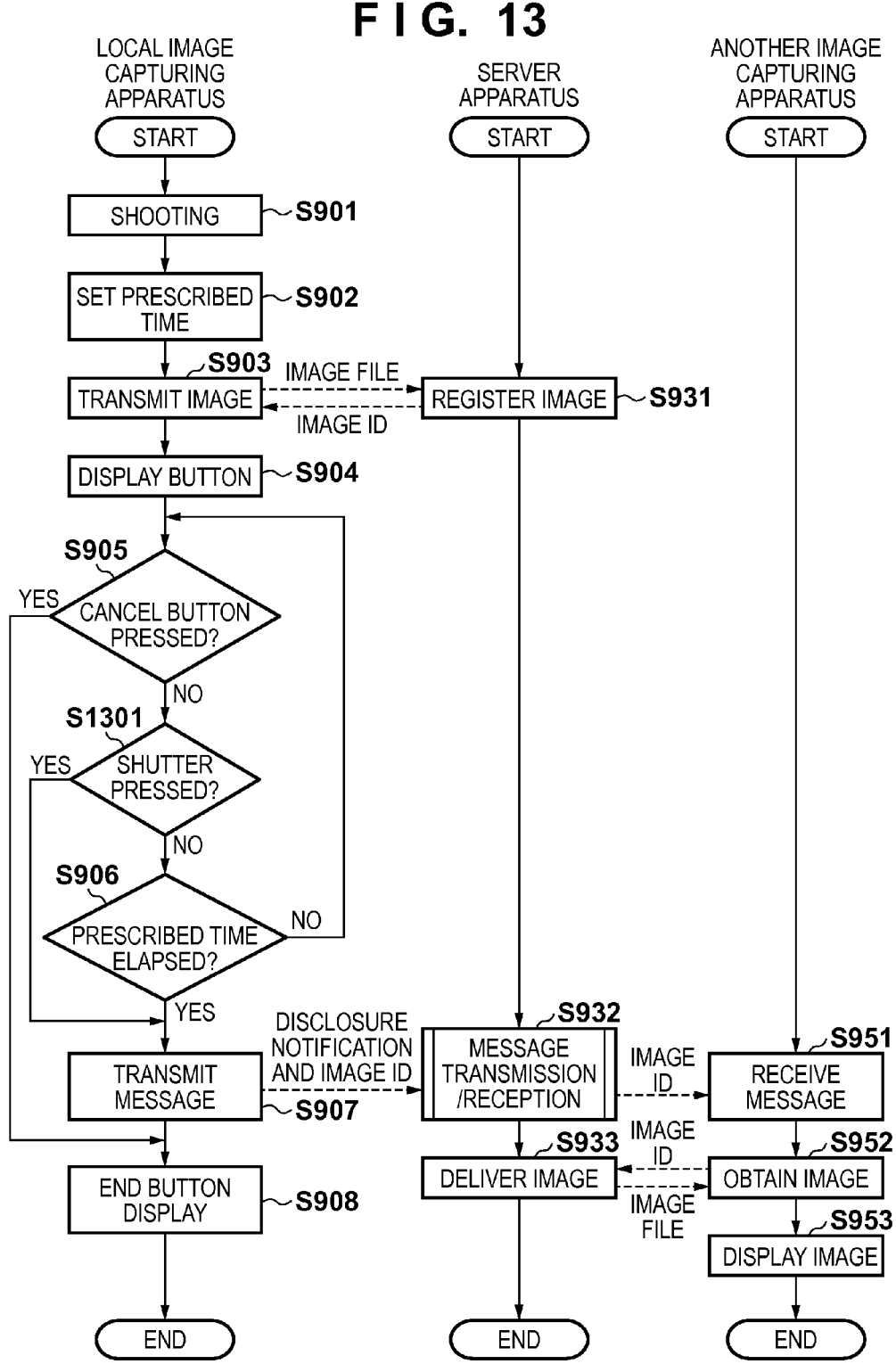
FIG. 13 is an operation flowchart of the system according to the second embodiment.

In this embodiment, when a shutter button for the next shooting is pressed within a cancel acceptance time (prescribed time) in an image capturing apparatus, a disclosure notification is transmitted to a server apparatus. FIG. 13 is a flowchart showing the operations of the image capturing apparatus, the server apparatus, and another image capturing apparatus according to this embodiment. The same parts as in the first embodiment (flowchart of FIG. 9) are omitted, and only different parts will be described with reference to the flowchart of FIG. 13.

In the processing sequence of the image capturing apparatus, S1301 is a step in which an image capturing device 204 detects pressing of a shutter button. If the image capturing device 204 detects that the shutter button is pressed (YES in step S1301), the process advances to step S907; otherwise (NO in step S1301), the process advances to step S906. This step is not limited to the detection of pressing of the shutter button by the image capturing device 204. If a shooting operation can be detected, any other method can be used. The remaining steps of the image capturing apparatus are the same as those in FIG. 9. The operations of the server apparatus and the other image capturing apparatus are also the same as those in FIG. 9, and a description thereof will be omitted. The operation of the second embodiment with reference to FIG. 13 has been described above.

Figure 14:
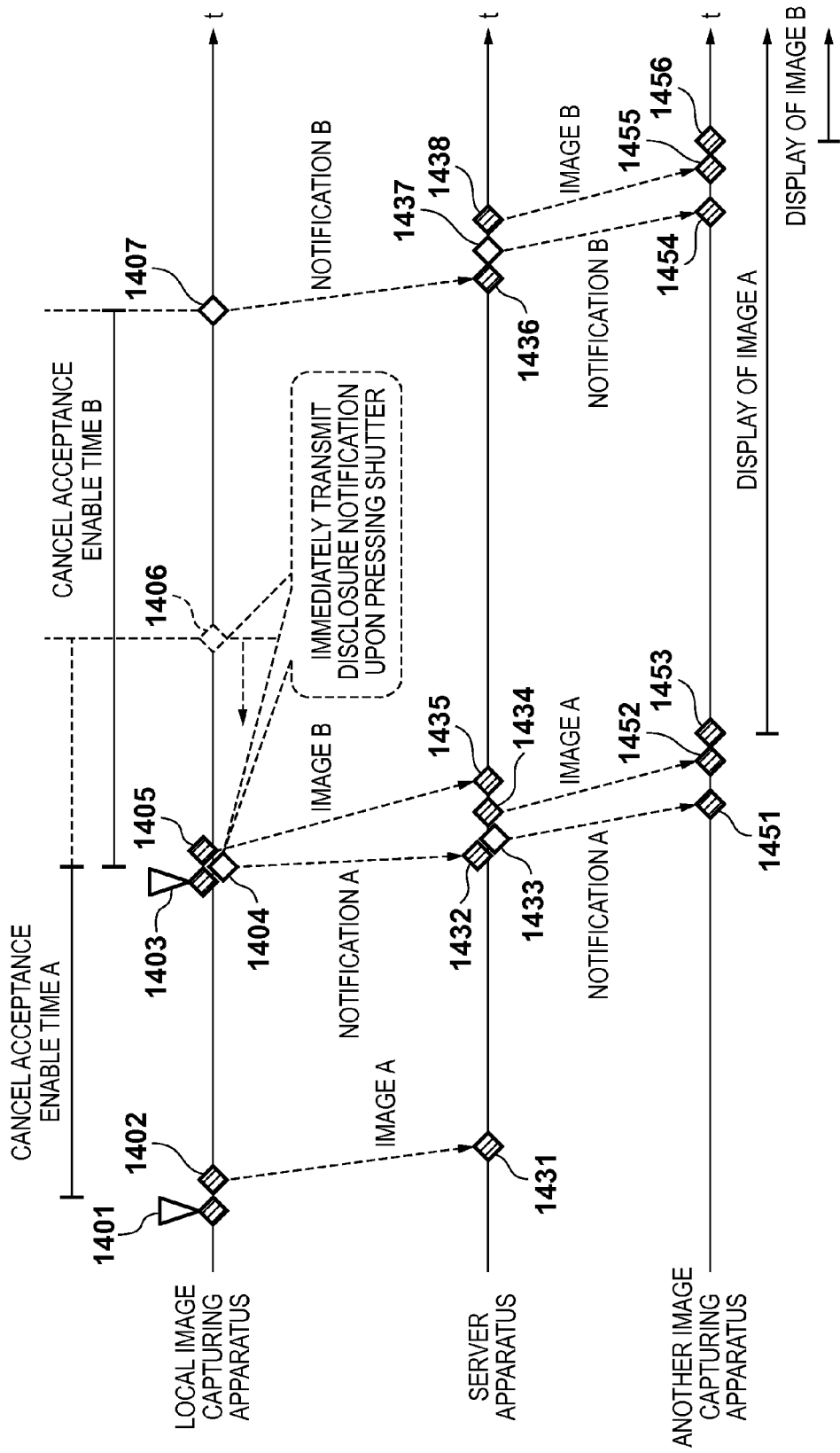
FIG. 14 is a view showing data exchange in the system according to the second embodiment.

FIG. 14 shows the data exchange between the image capturing apparatus and the server apparatus according to this embodiment. A process 1401 corresponds to step S901 and represents that the image capturing apparatus performs shooting. A process 1402 corresponds to step S903 and represents that the image capturing apparatus transmits an image file to the server apparatus. A process 1403 corresponds to step S1301 and represents that the image capturing apparatus detects the shooting operation during the cancel acceptance time. A process 1404 corresponds to step S907 and represents that the image capturing apparatus transmits a disclosure notification and an image ID to the server apparatus. A process 1405 represents that the image capturing apparatus transmits an image shot in the process 1403. When the process 1403 corresponds to step S901, the process 1405 corresponds to step S903. A process 1406 represents the end time of the original cancel acceptance time. A process 1407 represents that a message for the image shot in the process 1403 is transmitted. If the process 1403 corresponds to step S901, the process 1407 corresponds to step S907.

A process 1431 corresponds to step S931 and represents that the server apparatus stores the image shot in the process 1401. A process 1432 and a process 1433 correspond to step S932 and represent that the server apparatus receives the disclosure notification and the image ID from the image capturing apparatus and transmits the image ID to the other image capturing apparatus. A process 1434 corresponds to step S933 and represents that the server delivers the image shot in the process 1401 to the other image capturing apparatus. A process 1435 represents that the server apparatus stores the image shot in the process 1403. A process 1436 and a process 1437 represent that the server apparatus receives the disclosure notification and the image ID of the image shot in the process 1403 and transmits the image ID to the other image capturing apparatus. The processes 1436 and 1437 correspond to step S932. A process 1438 represents that the image shot in the process 1403 is delivered to the other image capturing apparatus. A process 1451 and a process 1454 correspond to step S951. A process 1452 and a process 1455 correspond to step S952. A process 1453 and a process 1456 correspond to step S953. Processes from the process 1451 to the process 1453 target the image shot in the process 1401. Processes from the process 1454 to the process 1456 target the image shot in the process 1403.

In this embodiment, when the user presses the shutter button even during the display of the image shot within the cancel acceptance time in the image capturing apparatus, the disclosure notification is immediately transmitted to the server apparatus, and the user can perform the next shooting. This makes it possible for the user to perform shooting without missing any shooting opportunity if a priority object to be shot exits. Since the next shooting can be immediately performed, the image capturing apparatus can cope with continuous shooting. If the user judges that a shot image can be disclosed, the shutter button can be used in place of the disclosure permission button.

<Third Embodiment>

Figure 15:
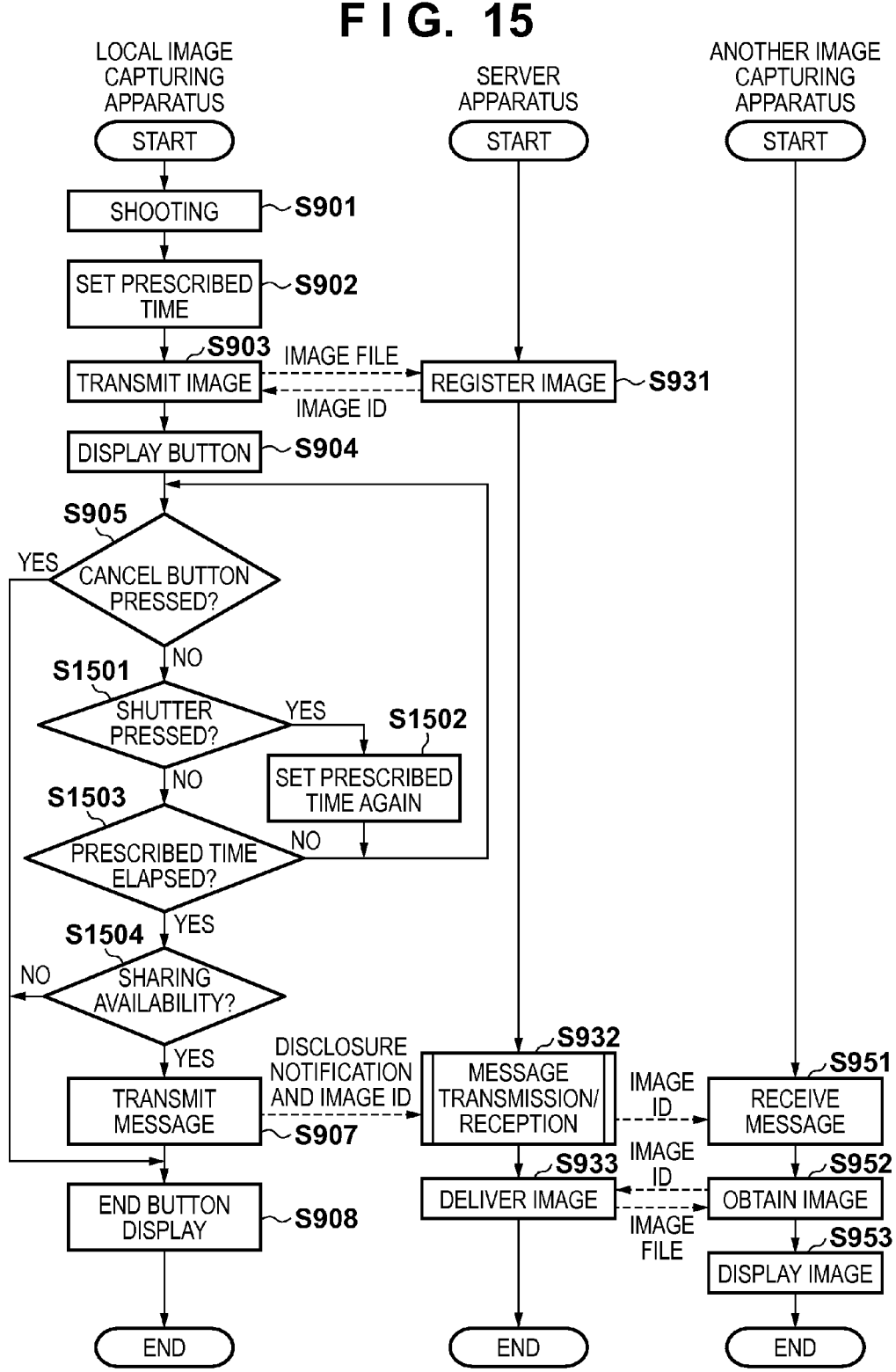
FIG. 15 is an operation flowchart of a system according to the third embodiment.

In the second embodiment, the image capturing apparatus judges that the disclosure is permitted when pressing the shutter button within the cancel acceptance time, and the disclosure notification is immediately transmitted. However, in the third embodiment, when the shutter button is pressed, an image without disclosure availability judgment is suspended, and disclosure availability judgment is made for the suspended image file after the lapse of the certain time. FIG. 15 is a flowchart showing the operations of an image capturing apparatus, a server apparatus, and another image capturing apparatus. The same parts as in the first embodiment (flowchart in FIG. 9) will be omitted, and only parts different from those of the first embodiment will be described with reference to the flowchart in FIG. 15.

In the processing sequence of the image capturing apparatus, S1501 is a step in which an image capturing device 204 detects pressing of the shutter button. If pressing of the shutter button is detected (YES in step S1501), the process advances to step S1502; otherwise (NO in step S1501), the process advances to step S1503. Note that this step is not limited to the case in which the image capturing device 204 detects pressing of the shutter button, but can be any other method if the shooting operation can be detected. S1502 is a step in which a CPU 201 sets a prescribed time again and prolongs it. In this step, the user may set the time using a time setting unit (not shown) and the CPU 201 may manage the set time. S1503 is a step in which the CPU 201 judges whether the prescribed time has elapsed. If the prescribed time has elapsed (YES in step S1503), the process advances to step S1504; otherwise (NO in step S1503), the process advances to step S905. S1504 is a step in which the CPU 201 causes the display device to display a sharing availability selection screen and causes the user to judge the sharing availability. If the CPU 201 judges that sharing is possible (YES in step S1504), the process advances to step S907; otherwise (NO in step S1504), the process advances to step S908. FIGS. 16A and 16B show an example of the UI for allowing the user to select sharing availability when continuous shooting is performed. In order to allow the user to select sharing availability, a plurality of images may be target images as shown in FIG. 16A. Alternatively, each image may be a target image as shown in FIG. 16B. The third embodiment has been described with reference to FIG. 15.

Figure 17:
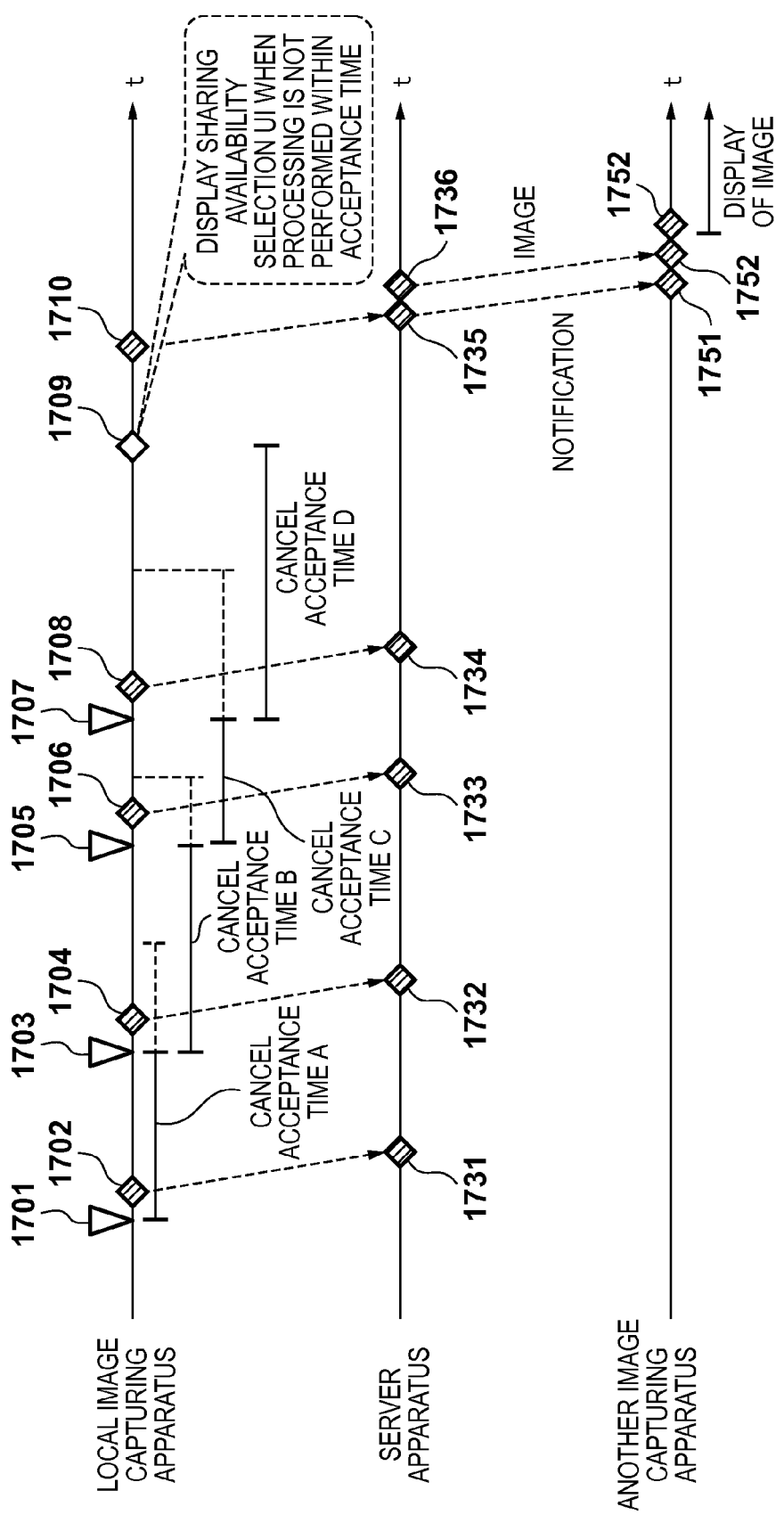
FIG. 17 is a view showing data exchange in a system according to the third embodiment.

FIG. 17 shows the data exchange between the image capturing apparatus and the server apparatus according to this embodiment. A process 1701 corresponds to step S901 and represents that the image capturing apparatus performs shooting. A process 1702 corresponds to step S903 and represents that the image capturing apparatus transmits the image file of the image shot in the process 1701 to the server apparatus. A process 1703 corresponds to step S1501 and represents that the image capturing apparatus performs shooting during the disclosure cancel acceptance time of the image shot in the process 1701. A process 1704 represents that the image capturing apparatus transmits the file of the image shot in the process 1703 to the server apparatus. The process 1704 corresponds to step S903. A process 1705 corresponds to step S1501 and represents that the image capturing apparatus performs shooting during the disclosure cancel acceptance time of the image shot in the process 1703. A process 1706 represents that the image capturing apparatus transmits the file of the image shot in the process 1705 to the server apparatus. The process 1706 corresponds to step S903. A process 1707 corresponds to step S1501 and represents that the image capturing apparatus performs shooting during the disclosure cancel acceptance time of the image shot in the process 1705.

A process 1708 represents that the image capturing apparatus transmits the file of the image shot in the process 1707 to the server apparatus. The process 1708 corresponds to step S903. A process 1709 corresponds to step S1504 and represents that the image capturing apparatus displays a disclosure availability selection screen for the images shot in the steps 1701, 1703, and 1705 in which disclosure availability selection is suspended. A process 1710 corresponds to step S907 and represents that the image capturing apparatus transmits the disclosure notification and image ID to the image selected in the process 1709. Processes from a process 1731 to a process 1734 represent that the server apparatus stores the images shot in the processes 1701, 1703, 1705, and 1707. These processes correspond to step S931. A process 1735 represents that the server apparatus receives the disclosure notification and image ID transmitted in the process 1710. The process 1735 corresponds to step S932. A process 1736 represents that the image is delivered to the other image capturing apparatus based on the disclosure notification and image ID received by the server apparatus in the process 1735. The process 1736 corresponds to step S933. The process 1751 corresponds to step S931, the process 1752 corresponds to step S952, and the process 1753 corresponds to step S953. The operations of these processes are the same as those in the first embodiment, and a description thereof will be omitted.

According to the third embodiment, while the user does not make sharing availability judgment, the image capturing apparatus can perform shooting even if a priority object to be shot exists. In addition, the sharing availability selection UI is displayed after shooting, thereby allowing user to select sharing availability judgment. Unlike the second embodiment, this makes it possible not to immediately disclose the shot image to other users. The user can select sharing availability at the end of a certain time. An image that the user does not want to disclose such as a failed image need not be shared with other users. For example, when the user performs continuous shooting in the image capturing apparatus, all the images need not be disclosed but can be selectively disclosed. The capacity can advantageously be reduced in the other image capturing apparatus.

<Fourth Embodiment>

Figure 18:
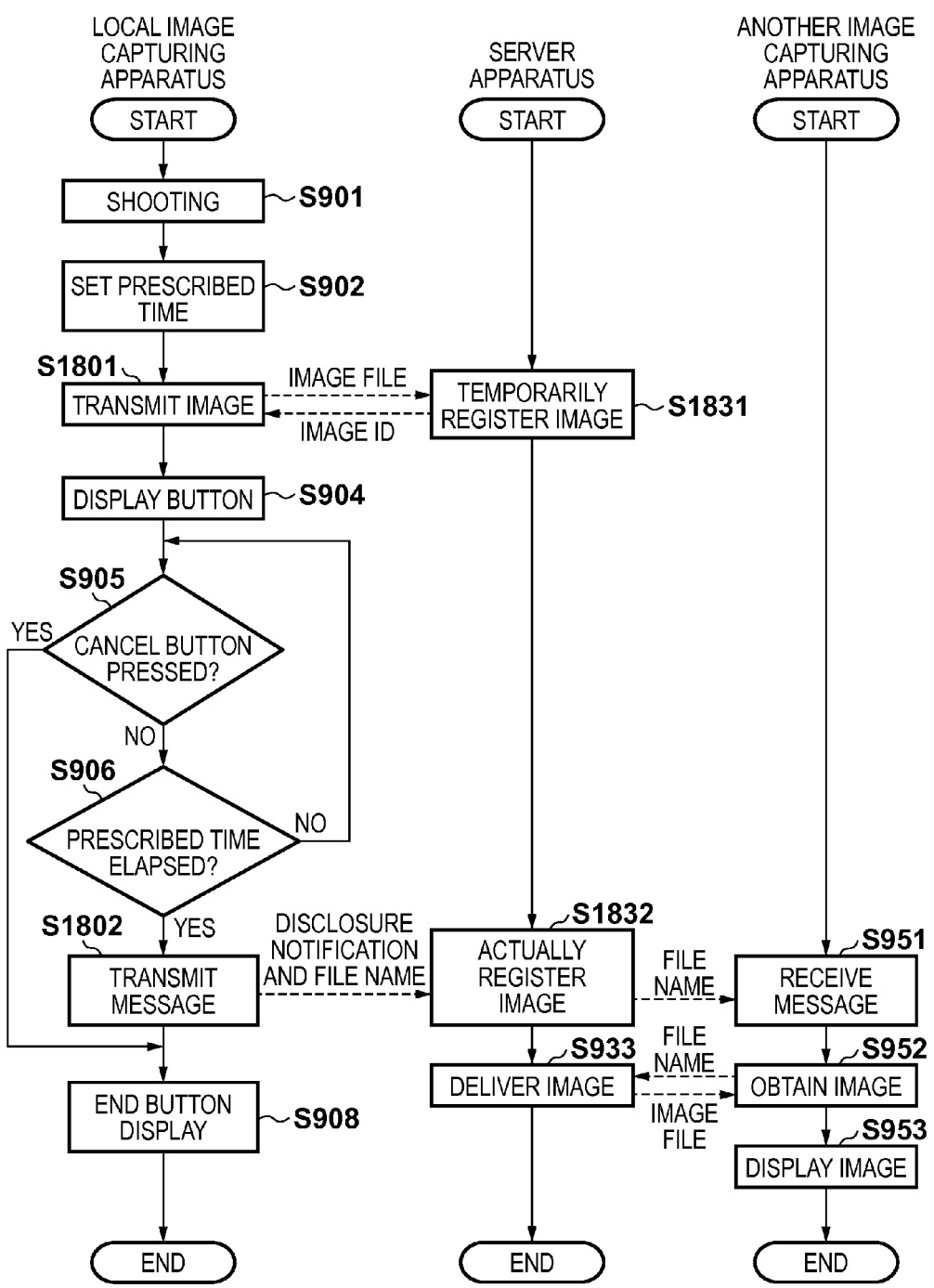
FIG. 18 is an operation flowchart of a system according to the fourth embodiment.

In the first to third embodiments, the server apparatus side registers an image using a management table such as an image table 701 of FIG. 7 and transmits the registered file location (file name) in the form of a message. This embodiment will exemplify a case in which the server apparatus prepares a shared folder as the sharing storage location, and the shared folder is accessed to share a file in the folder. FIG. 18 is a flowchart showing the operations of an image capturing apparatus, a server apparatus, and another image capturing apparatus according to this embodiment. Parts different from the first embodiment (flowchart in FIG. 9) will be described with reference to the flowchart of FIG. 18.

S1801 is a step in which a wireless communication device 208 in the image capturing apparatus transmits the image file of an image shot by the image capturing apparatus and receives a file name corresponding to the image file from the server apparatus. S1802 is a step in which when a prescribed time has elapsed, the wireless communication device 208 transmits a disclosure notification and the file name received in step S1801 to the server apparatus. S1831 is a step in which an image storage unit 403 in the server apparatus temporarily stores, in a storage service 107, the image file transmitted from the image capturing apparatus. The temporary storage location is a folder at a location different from that used for the shared holder. When storing the image file, a group forming unit 402 adds information for identifying a group ID and apparatus ID to the file name, thereby identifying the group and apparatus. S1832 is a step in which when a notification reception unit 405 receives the disclosure notification and file name from the image capturing apparatus, an image storage unit 403 moves the image file stored in step S1831 from the temporary folder to the shared holder, and a notification transmission unit 406 transmits the file name to the other image capturing apparatus. The fourth embodiment with reference to FIG. 18 has been described above.

Figure 19:
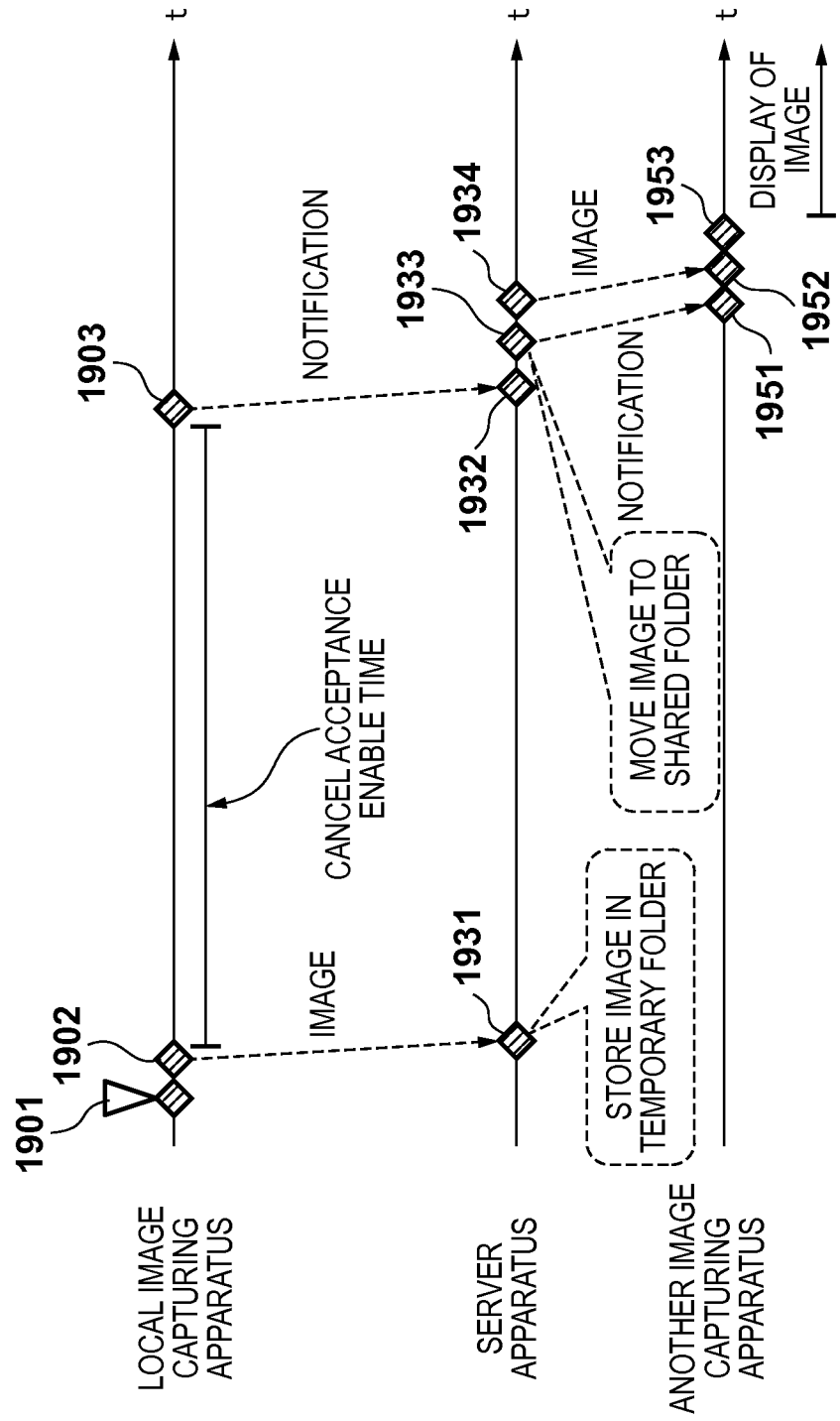
FIG. 19 is a view showing data exchange in the system according to the fourth embodiment.

FIG. 19 shows the data exchange between the image capturing apparatus and the server apparatus. A process 1901 corresponds to step S901 and represents that the image capturing apparatus performs shooting. A process 1902 corresponds to step S903 and represents that the image capturing apparatus transmits an image file to the server apparatus. A process 1903 corresponds to step S1802 and represents that the image capturing apparatus transmits a disclosure notification and a file name to the server apparatus. A process 1931 corresponds to step S1831 and represents that the server apparatus stores the image file in the temporary folder. A process 1932 and a process 1933 correspond to step S1832 and represent that the server apparatus receives the disclosure notification and the file name, moves the image file stored in the process 1931 to the shared folder, and transmits the file name to the other image capturing apparatus. A process 1934 corresponds to step S933 and represents that the image file is delivered to the other image capturing apparatus. Processes from a process 1951 to a process 1953 correspond to steps S951 to S953. These processes are the same as those of the first embodiment, and a description thereof will be omitted.

This embodiment has described the method of controlling the disclosure when the server apparatus uses the shared folder. Since an image management table, which may be in a database, is not used, the number of messages to be exchanged can be reduced, and the user need only confirm the update state of the shared folder. The server apparatus need not be directly transmitted to the shared folder, but can be stored in the temporary folder. This makes it possible to cancel the disclosure even after transmission of the image file to the server apparatus. This embodiment has exemplified that the other image capturing apparatus confirms the image of the shared folder by the message from the server apparatus. However, the other image capturing apparatus may periodically check the shared folder. Note that although the description of this embodiment has been made based on the first embodiment, this embodiment is not limited to the description of the first embodiment, but can be made using other embodiments.

<Fifth Embodiment>

In the fourth embodiment, a plurality of storage locations such as the shared folder and the temporary folder in the server apparatus are prepared. However, in the fifth embodiment, a server apparatus uses a shared folder, and a file format is changed. FIG. 20 is a flowchart showing the operations of an image capturing apparatus, a server apparatus, and another image capturing apparatus according to this embodiment. Parts different from those of the first embodiment (flowchart in FIG. 9) will be described with reference to the flowchart of FIG. 20.

S2001 is a step in which a CPU 201 of the image capturing apparatus converts an image file into another format and a wireless communication device 208 transmits the converted image file to the server apparatus. The other format is a format which cannot be recognized as a file to be shared from the other image capturing apparatus when the file is stored in the shared folder in the server apparatus. S2031 is a step in which a communication unit 401 of the server apparatus receives the image file transmitted from the image capturing apparatus and the image file received by an image storage unit 403 is stored in the shared folder. S2032 is a step in which a notification reception unit 405 receives a disclosure notification and a file name from the image capturing apparatus, the image storage unit 403 converts the target file into the file of an image format, and a notification transmission unit 406 transmits the file name to the other image capturing apparatus. The fifth embodiment with reference to FIG. 20 has been described above.

Figure 21:
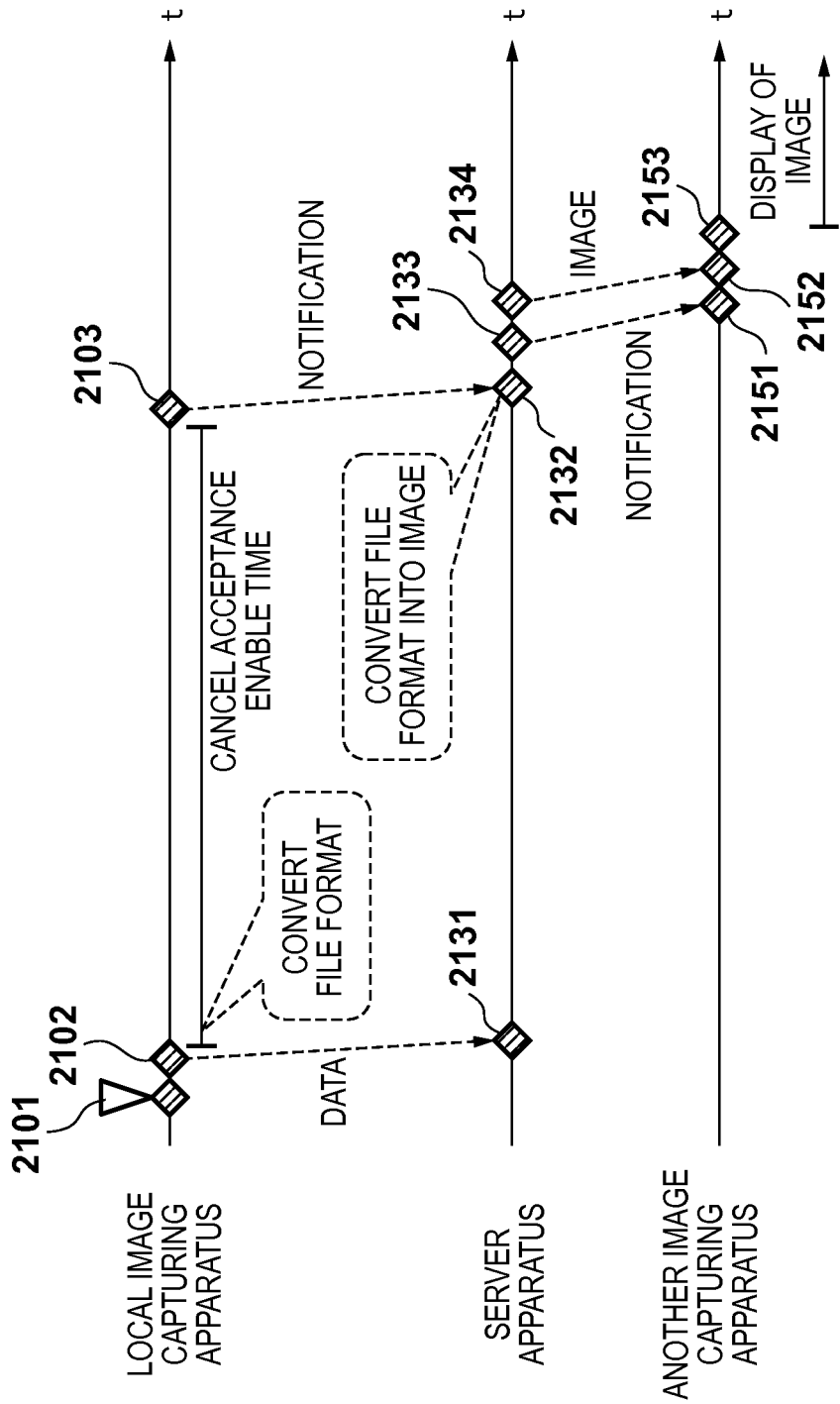
FIG. 21 is a view showing data exchange in the system according to the fifth embodiment.

FIG. 21 shows the data exchange between the image capturing apparatus and the server apparatus according to this embodiment. A process 2101 corresponds to step S901 and represents that the image capturing apparatus performs shooting. A process 2102 corresponds to step S2001 and represents that the image capturing apparatus changes the file format of the image shot in the process 2101 and transmits the image to the server apparatus. A process 2131 corresponds to step S2031 and represents that the server apparatus stores the image file transmitted from the image capturing apparatus. A process 2132 corresponds to step S2032 and represents that the server apparatus receives the disclosure notification and file name from the image capturing apparatus and the image file stored in the process 2131 is changed into the image file format. A process 2133 represents that the server apparatus transmits the file name to the other image capturing apparatus. A process 2134 corresponds to step S933 and represents that the server apparatus delivers the image. Processes from a process 2151 to a process 2153 correspond to steps S951 to S953. These processes are the same as those in the first embodiment, and a description thereof will be omitted.

This embodiment has described the method of controlling shared information by converting the file format in the image capturing apparatus. In this embodiment, the image capturing apparatus converts the file itself. However, if the image capturing apparatus is an apparatus for determining a file type using only the extension of the file, the extension may be changed to convert the file format. If the same effect as described is obtained when the image capturing apparatus changes a file attribute into the attribute of a hidden file, the file attribute may be changed. In this embodiment, the image capturing apparatus changes the file format. However, the image capturing apparatus may transmit an image and its file format may be changed by the server apparatus. Note that this embodiment has been described based on the first embodiment. However, this embodiment may comply with other embodiments in place of the first embodiment.

<Sixth Embodiment>

Figure 22:
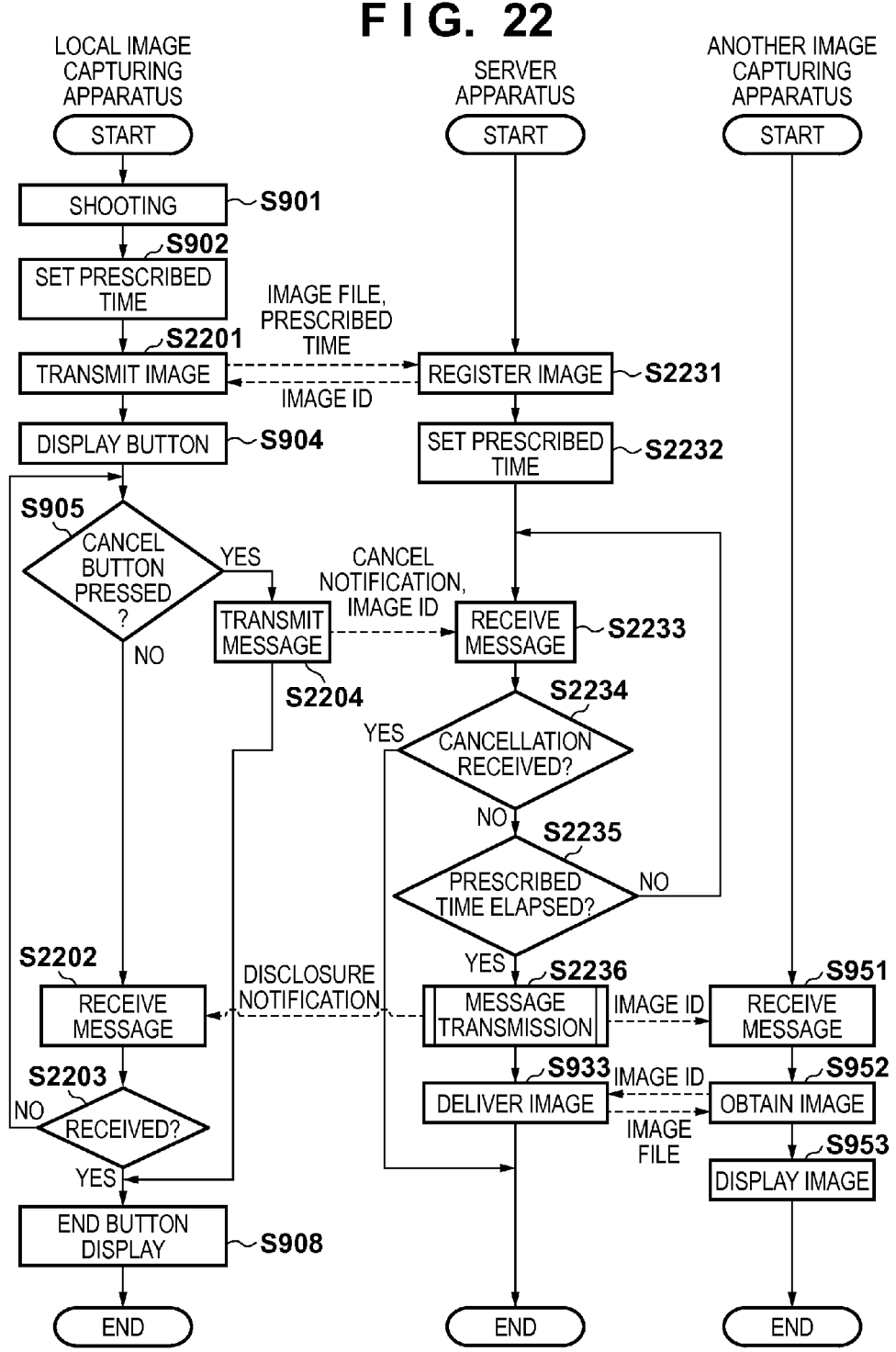
FIG. 22 is an operation flowchart of a system according to the sixth embodiment.

According to the first to fifth embodiments, the image capturing apparatus manages the cancel acceptance time (prescribed time). However, the sixth embodiment will exemplify that a server apparatus manages the cancel acceptance time. FIG. 22 is a flowchart showing the operation of an image capturing apparatus, a server apparatus, and another image capturing apparatus according to this embodiment. Parts different from the first embodiment (flowchart in FIG. 9) will be described with reference to the flowchart of FIG. 22.

S2201 is a step in which a wireless communication device 208 of the image capturing apparatus transmits an image file and a prescribed time set in step S902 to the server apparatus. S2202 is a step in which the wireless communication device 208 receives a disclosure notification from a notification transmission unit 406 when a time management unit 407 of the server apparatus judges that the prescribed time has elapsed. S2203 is a step in which a CPU 201 judges whether the disclosure notification is received from the server apparatus. If the disclosure notification is received (YES in step S2203), the process advances to step S908; otherwise (NO in step S2203), the process advances to step S905. S2204 is a step in which when the CPU 201 judges that the cancel button has been pressed, the wireless communication device 208 transmits the cancel notification to the server apparatus.

Next, S2231 is a step in which a communication unit 401 receives the image file and prescribed time transmitted from the image capturing apparatus, an image storage unit 403 stores them in a storage service 107, and the notification transmission unit 406 transmits the image ID of the stored image file to the image capturing apparatus. S2232 is a step in which the time management unit 407 sets the prescribed time received in step S2231. S2233 is a step in which a notification reception unit 405 waits for reception of the cancel notification from the image capturing apparatus. When receiving the cancel notification from the image capturing apparatus, the notification reception unit 405 receives the image ID which is simultaneously communicated. S2234 is a step in which it is judged whether the notification reception unit 405 has received the cancel notification in step S2233. If it is judged that the notification reception unit 405 has received the cancel notification (YES in step S2234), the process advances to end processing; otherwise (NO in step S2234), the process advances to step S2235. Note that when the notification reception unit 405 has received the cancel notification, sharing information ("shared" item) of an image table 701 is kept as "non-disclosure". The sharing information is not notified to the other image capturing apparatus, and no image is disclosed.

S2235 is a step in which it is judged whether the prescribed time set by the time management unit 407 in step S2232 has elapsed. If it is judged that the prescribed time has elapsed (YES in step S2235), the process advances to step S2236; otherwise (NO in step S2235), the process advances to step S2233. S2236 is a step in which the notification transmission unit 406 transmits the image ID to the other image capturing apparatus, and a disclosure notification is transmitted to the image capturing apparatus which has transmitted the shot image. Unlike in step S932, the notification transmission unit 406 transmits the disclosure notification to the image capturing apparatus which has transmitted the shot image, thereby notifying the image capturing apparatus of the timing of the cancel button display end. The sixth embodiment has been described with reference to FIG. 22.

Figure 23:
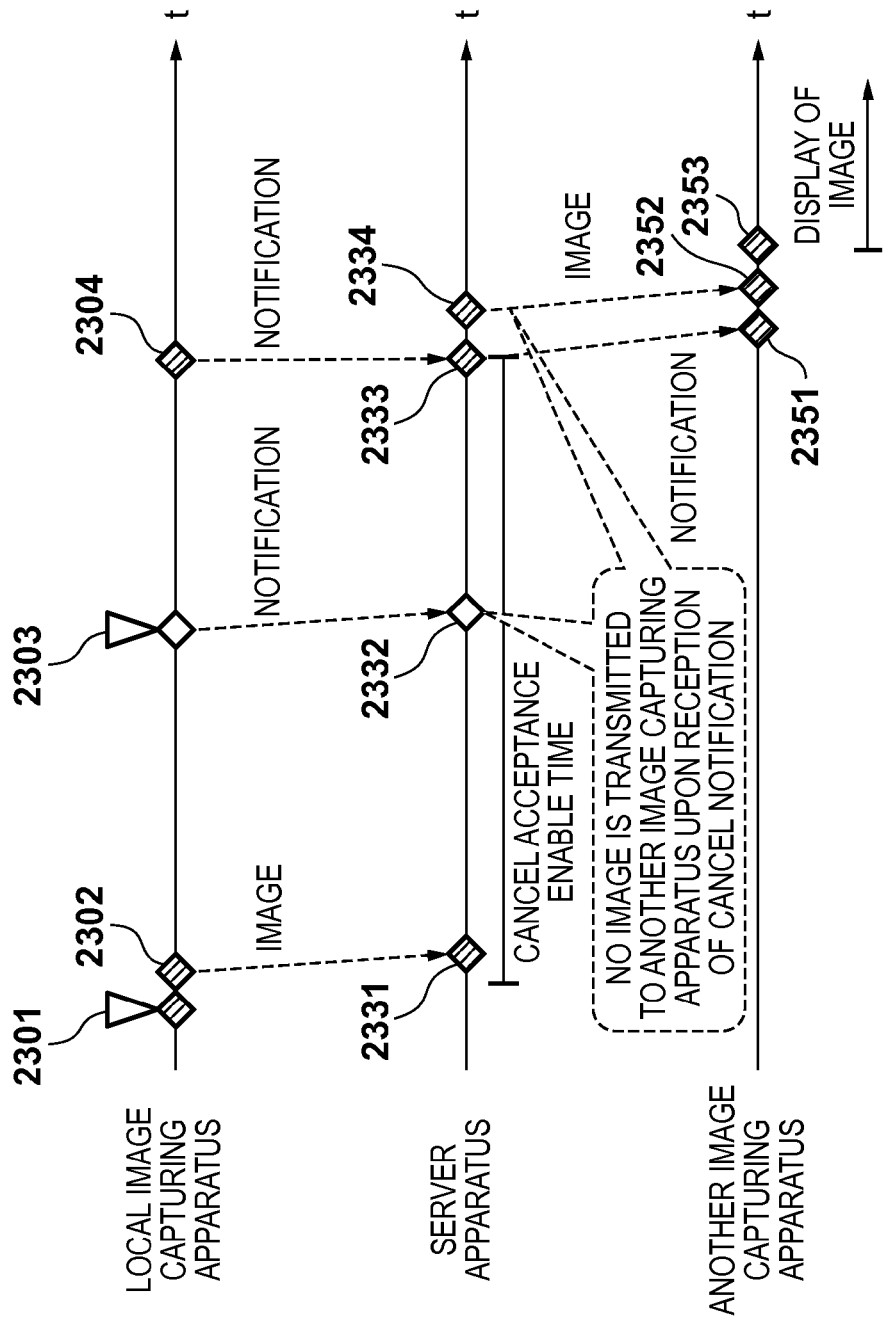
FIG. 23 is a view showing data exchange of the system according to the sixth embodiment.

FIG. 23 shows the data exchange between the image capturing apparatus and the server apparatus according to this embodiment. A process 2301 corresponds to step S901 and represents that the image capturing apparatus performs shooting. A process 2302 corresponds to step S2201 and represents that the image capturing apparatus transmits the image file and the cancel acceptance time (prescribed time) information to the server apparatus. A process 2303 corresponds to step S2204 and represents that the image capturing apparatus transmits the cancel notification to the server apparatus. A process 2304 corresponds to step S2202 and represents that the server apparatus transmits the disclosure notification to the image capturing apparatus upon the elapse of the prescribed time. A process 2331 corresponds to step S2231 and represents that the server apparatus receives the image file from the image capturing apparatus, stores it, and receives the prescribed time information. A process 2332 corresponds to step S2233 and represents that the server apparatus receives the cancel notification from the image capturing apparatus. A process 2333 corresponds to step S2202 and represents that the server apparatus transmits the disclosure notification to the image capturing apparatus. A process 2334 corresponds to step S933 and represents that the server apparatus delivers the image to the other image capturing apparatus. Processes from a process 2351 to a process 2353 correspond to steps S951 to S953. These processes are the same as those in the first embodiment, and a description thereof will be omitted.

In this embodiment, when the server apparatus manages the cancel acceptance time and a communication state is not so good, the disclosure notification transmission to the other image capturing apparatus may be delayed. However, it is possible to disclose the image to the other image capturing apparatus upon the elapse of the prescribed time. Note that both the server apparatus and the image capturing apparatus may manage the prescribed time in place of the prescribed time management by one of them.

<Seventh Embodiment>

Figure 24:
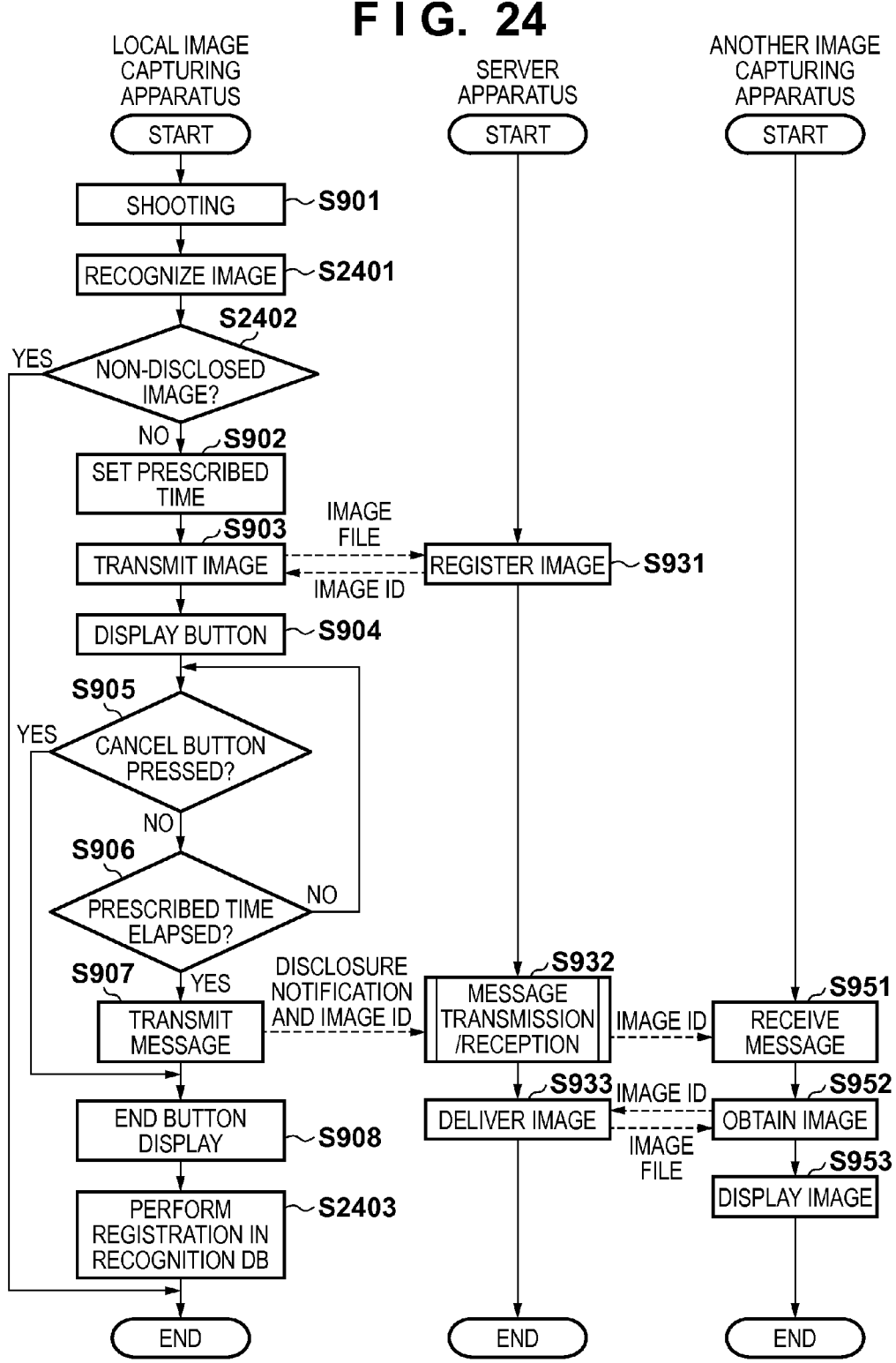
FIG. 24 is an operation flowchart of a system according to the seventh embodiment.

In the first to sixth embodiments, the image capturing apparatus decides the image disclosure availability by the selective input of the user. The seventh embodiment will exemplify a process in which an image capturing apparatus determines an object by image recognition to decide the disclosure availability. FIG. 24 is a flowchart showing the operations of an image capturing apparatus, a server apparatus, and another image capturing apparatus according to this embodiment. Parts different from the first embodiment (flowchart of FIG. 9) will be described with reference to the flowchart of FIG. 24.

S2401 is a step in which a CPU 201 of the image capturing apparatus performs image recognition processing for an image shot in step S901. Image recognition processing is not limited to a specific technique as long as the object can be determined, and a known technique may be used. For example, the CPU 201 detects a human organ such as the eye or mouth of a face, extracts feature amounts from the positional relationship and shape of the human organ, and forms a database. S2402 is a step in which the CPU 201 judges whether the image recognition result in step S2401 indicates an image including an object serving as a non-disclosed object. If it is determined that the object is the non-disclosed object (YES in step S2402), the process advances to the end processing; otherwise (NO in step S2402), the process advances to step S902. S2403 is a step in which information judged to be disclosed or non-disclosed is registered by the CPU 201 in a recognition database (DB) (not shown). The recognition information of the object included in the image judged to be non-disclosed is registered in the database, and this information is used in a step of judging whether the information is non-disclosed in step S2402. The seventh embodiment with reference to FIG. 24 has been described.

Figure 25:
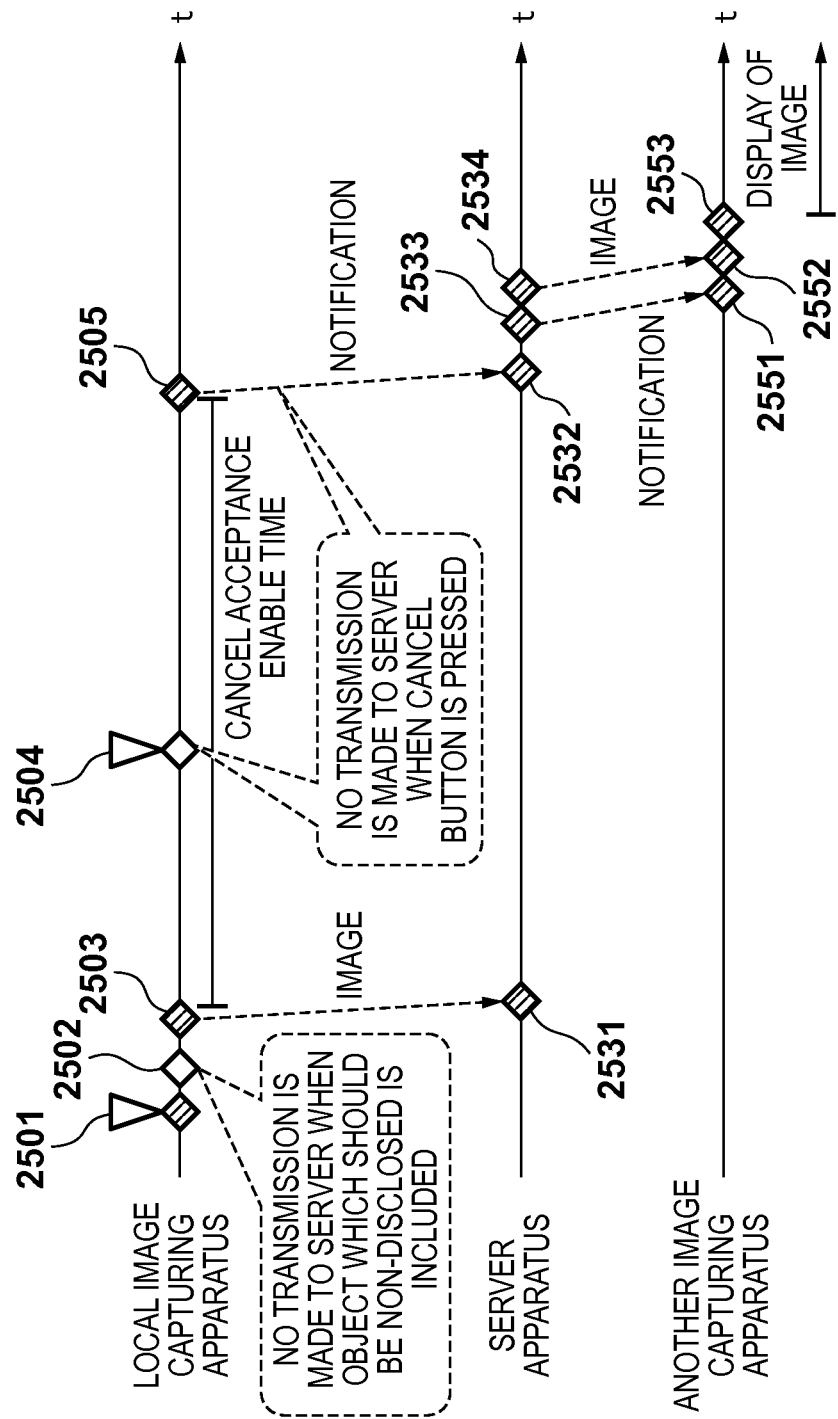
FIG. 25 is a view showing data exchange in the system according to the seventh embodiment.

FIG. 25 shows the data exchange between the image capturing apparatus and the server apparatus according to this embodiment. A process 2501 corresponds to step S901 and represents that the image capturing apparatus performs shooting. A process 2502 corresponds to steps S2401 and S2402 and represents that the image capturing apparatus performs the image recognition processing and judgment processing for judging based on the processing result whether the image is shared. A process 2503 corresponds to step S903 and represents that the image capturing apparatus transmits the image file to the server apparatus. A process 2504 corresponds to step S905 and represents processing when the cancel button is pressed. A process 2505 corresponds to step S907 and represents that the image capturing apparatus transmits the disclosure notification and the image ID to the server apparatus. Processes from a process 2531 to a process 2534 correspond to steps S931 to S933. These processes are the same as those in the first embodiment, and a description thereof will be omitted. Processes from a process 2551 to a process 2553 correspond to steps S951 to S953. These processes are the same as those in the first embodiment, and a description thereof will be omitted.

According to this embodiment, the image capturing apparatus judges whether the image is non-disclosed by image recognition processing in place of the case in which disclosure cancellation is manually judged by the user. Accordingly, the image capturing apparatus can determine in advance the object which should not be disclosed. When this object is unintentionally included in a shot image, the image can automatically be set as a non-disclosed image. The contents to be recognized in the image recognition processing and the contents to be registered in the recognition database may be image feature amounts about shooting failures such as camera shake and blur. Accordingly, the failed images are not disclosed automatically. Note that in this embodiment, the image capturing apparatus includes the recognition database and performs image recognition processing. However, the server apparatus may have the recognition database and perform recognition processing. At this time, the server apparatus performs image recognition processing upon reception of the image. When the image is judged to be a non-disclosed image, the image is controlled not to be disclosed to the other image capturing apparatus.

<Eighth Embodiment>

Figure 26:
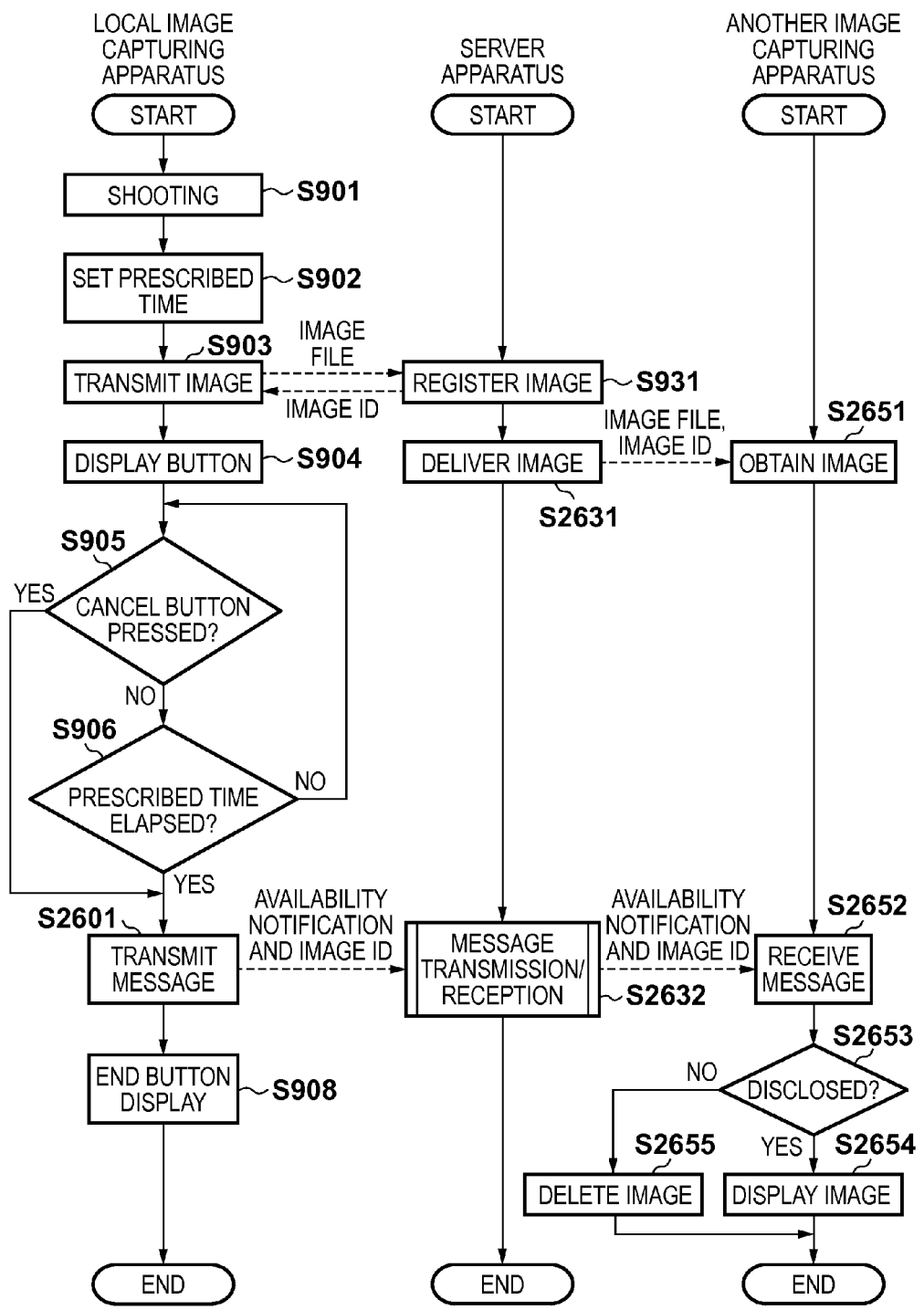
FIG. 26 is an operation flowchart of a system according to the eighth embodiment.

In the first to seventh embodiments, when the image is judged to be shared in the server apparatus, the other image capturing apparatus obtains the image file. The eighth embodiment will exemplify a process in which the server apparatus transmits an image file to another image capturing apparatus in a non-disclosed state, the other image capturing apparatus receives a disclosure notification transmitted from the server apparatus, and image sharing is started. FIG. 26 is a flowchart showing operations of an image capturing apparatus, a server apparatus, and another image capturing apparatus according to this embodiment. The same parts as in the first embodiment (flowchart in FIG. 9) will not be repeatedly described, and only parts different from the first embodiment will be described below with reference to the flowchart of FIG. 26.

S2601 is a step in which a wireless communication device 208 of the image capturing apparatus transmits a notification (availability notification) for judging whether the image ID of the target image is to be shared or not to be shared with the other image capturing apparatus. S2631 is a step in which a notification transmission unit 406 of the server apparatus transmits the image file and image ID stored in step S931 to the other image capturing apparatus. As shown in the flowchart of FIG. 10, a group forming unit 402 obtains a group ID from the image ID and an apparatus ID belonging to the group ID. The notification transmission unit 406 transmits the image file and image ID to the image capturing apparatus corresponding to the apparatus ID. In step S2632, a notification reception unit 405 receives the availability notification transmitted from the image capturing apparatus, and the notification transmission unit 406 transmits the availability notification and the image ID to the other image capturing apparatus.

S2651 is a step in which a wireless communication device 208 of the other image capturing apparatus receives the image file and image ID transmitted from the server apparatus and stores them in the recording region in a non-disclosed state. At this time, the other image capturing apparatus changes a storage folder as in the fourth embodiment or changes a file as in the fifth embodiment as long as the receiving image capturing apparatus does not allow the user to confirm the image. S2652 is a step in which the wireless communication device 208 receives the notification (availability notification) about sharing availability of the image file received in step S2651. S2653 is a step in which a CPU 201 judges based on the availability notification received by the wireless communication device 208 in step S2652 whether the image is disclosed or non-disclosed. If it is judged that the image is disclosed (YES in step S2653), the process advances to step S2654; otherwise (NO in step S2653), the process advances to step S2655. S2654 is a step in which the CPU 201 displays the image obtained in step S2651 on a display device 206. In this case, the CPU 201 changes the folder to the disclosure folder when the folder has been changed in step S2651 or inversely converts the file when the file has been converted. S2655 is a step in which since the image is non-disclosed, the CPU 201 deletes the image file stored in step S2651. The eighth embodiment with reference to FIG. 26 has been described above.

Figure 27:
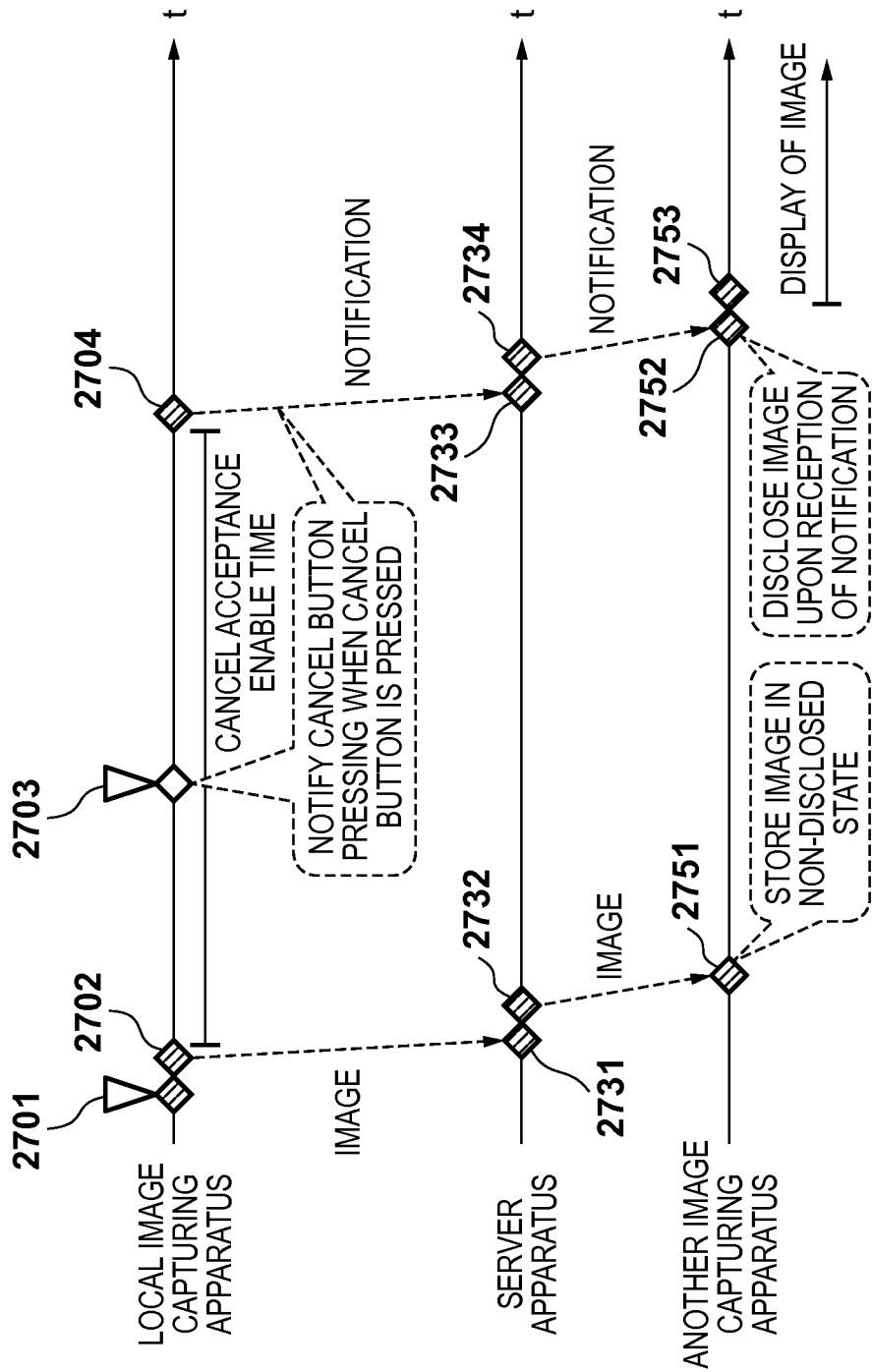
FIG. 27 is a view showing data exchange of the system according to the eighth embodiment.

FIG. 27 shows the data exchange between the image capturing apparatus and the server apparatus according to this embodiment. A process 2701 corresponds to step S901 and represents that the image capturing apparatus performs shooting. A process 2702 corresponds to step S903 and represents that the image capturing apparatus transmits the image file to the server apparatus. A process 2703 corresponds to step S905 and represents that the user presses the cancel button. A process 2704 corresponds to step S2601 and represents that the notification (availability notification) representing whether the cancel button is pressed or the cancel acceptance time has elapsed is transmitted. A process 2731 corresponds to step S931 and represents that the server apparatus stores the image file received from the image capturing apparatus. A process 2732 corresponds to step S2631 and represents that the server apparatus immediately transmits the image file stored in the process 2731 to the other image capturing apparatus. A process 2733 and a process 2734 correspond to step S2632 and represent that the server apparatus receives the disclosure notification and the image ID from the image capturing apparatus and transmits the disclosure notification and the image ID to the other image capturing apparatus. A process 2751 corresponds to step S2651 and represents that the other image capturing apparatus receives the image file from the server apparatus and stores it in the non-disclosed state. A process 2752 corresponds to step S2652 and represents that the other image capturing apparatus receives the availability notification from the server apparatus. A process 2753 corresponds to step S2654 and represents the image disclosure processing of the other image capturing apparatus.

According to this embodiment, upon reception of the image file from the image capturing apparatus, the server apparatus transmits the image file to the other image capturing apparatus in the non-disclosed state. That is, the image capturing apparatus performs image file transfer in advance, and the other image capturing apparatus shares the image upon reception of the disclosure notification as a trigger, thereby advancing the start of sharing. Note that in this embodiment, the server apparatus transmits the image file to the other image capturing apparatus. As in other embodiments, the server apparatus may output the notification, and the other image capturing apparatus may obtain the file.

<Ninth Embodiment>

Figure 28:
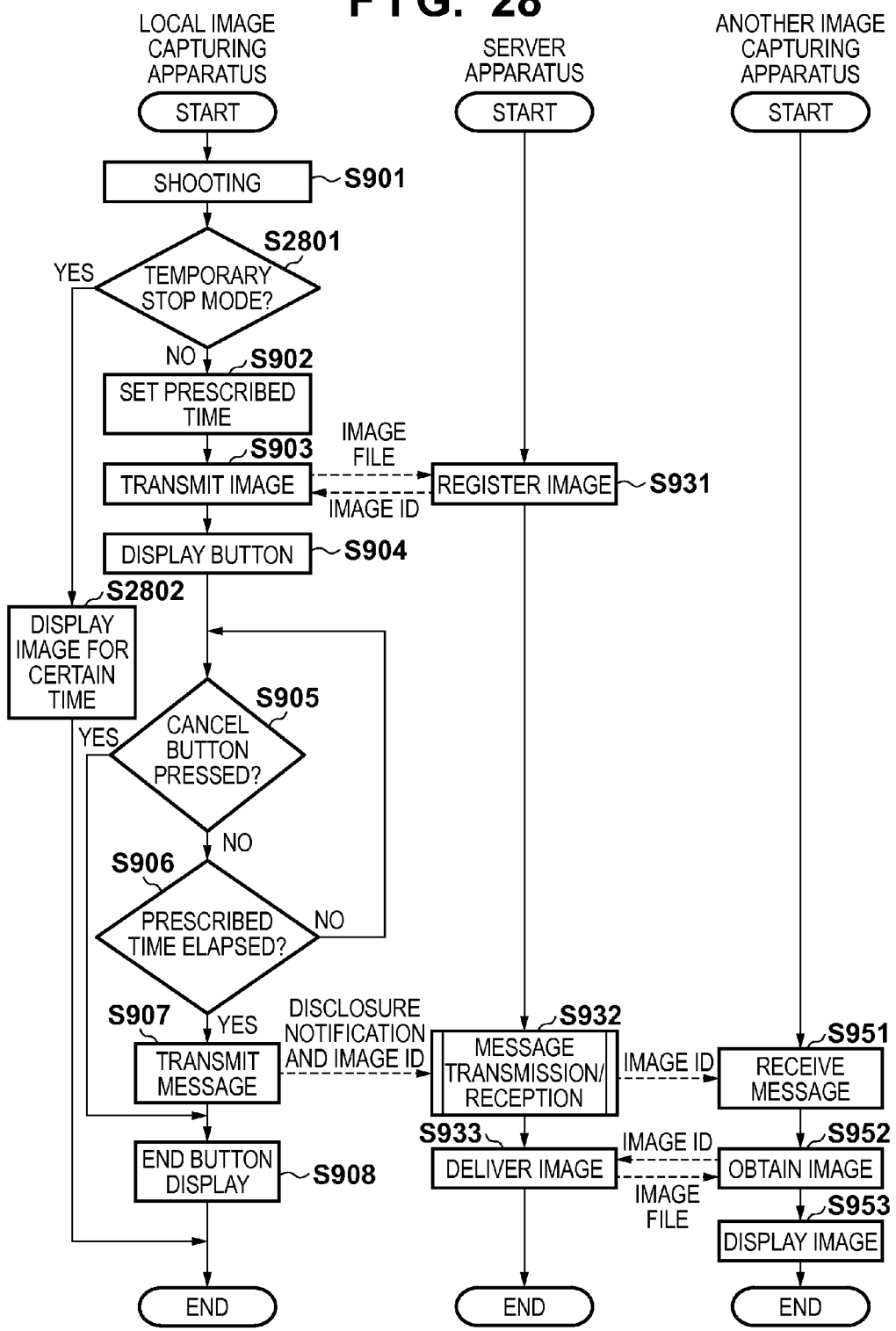
FIG. 28 is an operation flowchart of a system according to the ninth embodiment.

In the first to eighth embodiments, sharing availability of the image is judged after shooting by the image capturing apparatus. However, an image capturing apparatus of the ninth embodiment will exemplify a process in which an object which should not be shared is shot in advance. FIG. 28 is a flowchart showing the operations of an image capturing apparatus, a server apparatus, and another image capturing apparatus. The same parts as in the first embodiment (flowchart in FIG. 9) will be omitted, and parts different from the first embodiment will be described with reference to the flowchart of FIG. 28.

S2801 is a step in which a CPU 201 of the image capturing apparatus judges whether the mode is an automatic sharing mode or a temporary stop mode which does not share the image. If it is judged that the mode is the temporary stop mode (YES in step S2801), the process advances to step S2802; otherwise (NO in step S2801), the process advances to step S902. S2802 is a step in which the CPU 201 displays the image on a display device 206 for a certain time. A difference from step S904 is non-display of the cancel button (the cancel button is displayed in step S904). The ninth embodiment with reference to FIG. 28 has been described above.

FIG. 29 shows the data exchange between the image capturing apparatus and the server apparatus according to this embodiment. A process 2901 corresponds to step S901 and represents that the image capturing apparatus performs shooting. A process 2902 corresponds to step S903 and represents that the image capturing apparatus transmits the image file (image A) to the server apparatus. A process 2903 corresponds to step S907 and represents that the image capturing apparatus transmits the disclosure notification and image ID to the server apparatus. In this case, since the image is shot before the temporary stop period, the image can be transmitted even during the temporary stop period. A process 2904 and a process 2905 correspond to step S901 and represent the shooting operation during the temporary stop period. The image obtained at this time is not transmitted from the image capturing apparatus to the server. A process 2906 corresponds to step S901 and represents that the image capturing apparatus performs shooting. A process 2907 corresponds to step S903 and represents that the image capturing apparatus transmits the image file (image D) shot in the process 2906 to the server apparatus. A process 2908 corresponds to step S907 and represents that the image capturing apparatus transmits the disclosure notification and image ID to the server apparatus. Processes from a process 2931 to a process 2934 correspond to steps S931 to S933. Similarly, processes from a process 2935 to a process 2938 correspond to steps S931 to S933, and processes from a process 2935 to a process 2938 correspond to steps S931 to S933. These processes are the same as those in the first embodiment, and a description thereof will be omitted. Processes from a process 2951 to a process 2953 and a process 2954 to a process 2956 correspond to steps S951 to S953. These processes are the same as those in the first embodiment, and a description thereof will be omitted.

The image capturing apparatus can be set in advance in a mode in which when an object which should not be shared with others is to be shot, the temporary stop mode is set to reliably shoot the object in the non-sharing mode. Resignation from a group or reparticipation to the group need not be performed by setting a mode in which sharing to the group is temporarily stopped without having to resign from the group. When an invitation must be received in order to reparticipate to the group due to temporary stop mode, shooting opportunities of others will not be deprived. Note that in this embodiment, the image file is not transmitted to the server apparatus. However, for the backup purpose, the file may be transmitted to the server as in the other embodiments, and no disclosure notification may be transmitted.

As has been described above according to the embodiments, a shot image itself is automatically transmitted to the server, but the image is not subjected to disclosure setting upon only the completion of transmission. The user can select non-disclosure setting within a predetermined elapsed time. When the non-disclosure is not selected by the user within the predetermined time, the server apparatus performs the disclosure processing of the shot image. Accordingly, this makes it possible to cancel the disclosure of the shot image and automatically disclose the shot image after a certain time, thereby reducing the cumbersome operation of the user. In addition, a plurality of shot images can automatically be disclosed after the certain time, and the user need not select disclosure availability of each image. The shot image is transmitted to the server without confirmation of the non-disclosure by the user. This makes it possible to shorten the time until the start of sharing.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-268086, filed Dec. 25, 2013, which is hereby incorporated by reference herein in its entirety.

What is claimed is:

1. An information processing apparatus comprising:
a generation unit configured to generate data by a data generation operation by a user; and
a communication unit configured to transmit the data to an information management apparatus,
wherein, in a case where a prescribed time for which a disclosure cancel operation by the user to cancel disclosure of the data transmitted by the communication unit is allowed has elapsed without the disclosure cancel operation being performed by the user, the communication unit transmits a disclosure notification for causing the information management apparatus to disclose the data transmitted by the communication unit without an operation by the user, to the information management apparatus, and in a case where the disclosure cancel operation is performed by the user before the prescribed time has elapsed, the communication unit does not transmit the disclosure notification to the information management apparatus,
wherein at least one of the units is implemented by a processor operating in conjunction with a memory.

2. The information processing apparatus according to claim 1, further comprising a detection unit configured to detect the data generation operation by the user,
wherein when additional data generation operation is detected by the detection unit before the prescribed time has elapsed after the data is generated, the communication unit transmits, to the information management apparatus, the disclosure notification which allows the disclosure of the data.

3. The information processing apparatus according to claim 1, further comprising a detection unit configured to detect the data generation operation by the user, and
a display control unit configured to display an image to a display unit,
wherein the setting unit sets another prescribed time instead of the prescribed time in a case where the detection unit detects the data generation operation before the prescribed time has elapsed, and
the display control unit displays, on the display unit, an image for causing the user to select whether to allow the disclosure of the data, in a case where the other prescribed time has elapsed without performing a disclosure cancel operation by the user.

4. The information processing apparatus according to claim 1, wherein the communication unit transmits, to the information management apparatus, a disclosure cancel notification which cancels disclosure of the data in a case where a disclosure cancel operation is performed by the user during the prescribed time.

5. The information processing apparatus according to claim 1, wherein the communication unit transmits, to the information management apparatus, the data having a format different from that of data to be disclosed, by the information management apparatus to the other information processing apparatus.

6. The information processing apparatus according to claim 1, further comprising a determination unit configured to determine based on the data generated by the generation unit whether the data is disclosable to the other information processing apparatus,
wherein, in a case where the determination unit determines that the data is the disclosable data, the communication unit transmits the data to the information management apparatus.

7. The information processing apparatus according to claim 1, further comprising a selection unit configured to select by a user operation whether the data generated by the generation unit is disclosed to the other information processing apparatus.

8. The information processing apparatus according to claim 1, wherein the disclosure notification which allows the disclosure of the data contains information which identifies the data.

9. An information management apparatus comprising:
a communication unit configured to receive data generated by a first information processing apparatus and, and
a control unit configured to decide to disclose the data received by the communication unit and recorded in a recording unit to another information processing apparatus which is an information processing apparatus other than the first information processing apparatus, in a case where a prescribed time has elapsed since the communication unit received the data without receiving a disclosure cancel notification for canceling disclosure of the data received by the communication unit from the first information processing apparatus, and not to disclose the data received by the communication unit and recorded in the recording unit to the other information processing apparatus, in a case where the communication unit receives the disclosure cancel notification before the prescribed time elapsed since the communication unit received the data,
wherein at least one of the units is implemented by a processor operating in conjunction with a memory.

10. The information management processing apparatus according to claim 9, wherein the control unit decides to disclose the data to the other information processing apparatus, in case where the communication unit receives the data and then receives the disclosure notification which allows disclosure of the data from the first information processing apparatus.

11. The information management apparatus according to claim 9, wherein the control unit transmits a notification indicating that disclosure of the data to the other information apparatus is allowed, in a case where the communication unit receives the data, transmits the data to the other information apparatus, and receives a disclosure notification which allows disclosure of the data to the other information processing apparatus from first information processing apparatus.

12. The information management apparatus according to claim 10, further comprising a disclose unit configured to disclose the data to the other information processing apparatus by changing a format which is not displayed by the other information processing apparatus to another format which is displayed by the other information processing apparatus.

13. The information management apparatus according to claim 10, further comprising a management unit configured to manage the first information processing apparatus and the other information processing apparatus.

14. The information management apparatus according to claim 10, further comprising a disclose unit configured to disclose the data to the other information processing apparatus by moving the data from a storage location in which the other information processing apparatus cannot access to another storage location in which the other information processing apparatus can access, and
a management unit configured to manage the first information processing apparatus and the other information processing apparatus, wherein the management unit manages the data using a predetermined storage location.

15. A control method for an information processing apparatus, comprising:
generating data by a data generation operation by a user; and
transmitting the data to an information management apparatus,
wherein, in a case where a prescribed time for which a disclosure cancel operation by the user to cancel disclosure of the data transmitted in the transmitting is allowed has elapsed without the disclosure cancel operation being performed by the user, a disclosure notification for causing the information management apparatus to disclose the data transmitted in the transmitting is transmitted without an operation by the user to the information management apparatus, and, in a case where the disclosure cancel operation is performed by the user before the prescribed time has elapsed, the disclosure notification is not transmitted to the information management apparatus,
wherein at least one step of the method is implemented by a processor operating in conjunction with a memory.

16. A control method for an information management apparatus, comprising:
receiving data generated by a first information processing apparatus from the first information processing apparatus; and
deciding to disclose the data received in the receiving and recorded in a recording unit to another information processing apparatus which is an information processing apparatus other than the first information apparatus, in a case where a prescribed time has elapsed since the data was received without receiving a disclosure cancel notification for cancelling disclosure of received data by the information management apparatus from the first information processing apparatus, and not to disclose the data received in the receiving and recorded in the recording unit to the other information processing apparatus, in a case where the disclosure cancel notification is received before the prescribed time elapsed since the data was received in the receiving,
wherein at least one step of the method is implemented by a processor operating in conjunction with a memory.

17. A non-transitory computer-readable storage medium storing a computer program for causing a computer to execute an control method, the method comprising:
generating data by a data generation operation by a user; and
transmitting the data to an information management apparatus,
wherein, in a case where a prescribed time for which a disclosure cancel operation by the user to cancel disclosure of the data transmitted in the transmitting is allowed has elapsed without the disclosure cancel operation being performed by the user, a disclosure notification for causing the information management apparatus to disclose the data transmitted in the transmitting is transmitted without an operation by the user to the information management apparatus, and, in a case where the disclosure cancel operation is performed by the user before the prescribed time has elapsed, the disclosure notification is not transmitted to the information management apparatus.

18. A non-transitory computer-readable storage medium storing a computer program for causing a computer to execute an control method, the method comprising:
- receiving data generated by a first information processing apparatus; and
- deciding to disclose the data received in the receiving and recorded in a recording unit to another information processing apparatus which is an information processing apparatus other than the first information apparatus, in a case where a prescribed time has elapsed since the data was received without receiving a disclosure cancel notification for cancelling disclosure of received data from the first information processing apparatus, and not to disclose the data received in the receiving and recorded in the recording unit to the other information processing apparatus, in a case where the disclosure cancel notification is received before the prescribed time elapsed since the data was received in the receiving.

19. An information processing system comprising:
- a generation unit configured to generate data by a data generation operation by a user; and
- a communication unit configured to transmit the data to an information management apparatus,
- wherein, in a case where a prescribed time for which a disclosure cancel operation by the user to cancel disclosure of the data transmitted by the communication unit is allowed has elapsed without the disclosure cancel operation being performed by the user, the communication unit transmits a disclosure notification for causing the information management apparatus to disclose the data transmitted by the communication unit without an operation by the user, to the information management apparatus, and, in a case where the disclosure cancel operation is performed by the user before the prescribed time has elapsed, the communication unit does not transmit the disclosure notification to the information management apparatus,
- wherein at least one of the units is implemented by a processor operating in conjunction with a memory.

20. An information processing system comprising:
- a communication unit configured to receive data generated by a first information processing apparatus, and
- a control unit configured to decide to disclose the data received by the communication unit and recorded in a recording unit to another information processing apparatus which is an information processing apparatus other than the first information processing apparatus, in a case where a prescribed time has elapsed since the communication unit received the data without receiving a disclosure cancel notification for cancelling disclosure of the data received by the communication unit from the first information processing apparatus, and not to disclose the data received by the communication unit and recorded in the recording unit to the other information processing apparatus, in a case where the communication unit receives the disclosure cancel notification before the prescribed time elapsed since the communication unit received the data,
- wherein at least one of the units is implemented by a processor operating in conjunction with a memory.

* * * * *